(12) United States Patent
Kanamori et al.

(10) Patent No.: US 6,338,510 B1
(45) Date of Patent: Jan. 15, 2002

(54) AUTOMOTIVE BUMPER MOUNT STRUCTURE

(75) Inventors: Kenji Kanamori, Yokosuka; Hironori Saito, Kumamoto; Manabu Sato, Yokohama, all of (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/657,910

(22) Filed: Sep. 8, 2000

(30) Foreign Application Priority Data

Sep. 8, 1999 (JP) .......................... 11-254812
Sep. 8, 1999 (JP) .......................... 11-254878

(51) Int. Cl.[7] .............................................. B60R 19/24
(52) U.S. Cl. ........................ 293/154; 293/155; 296/188
(58) Field of Search ................................ 293/154, 155, 293/17; 296/188

(56) References Cited

U.S. PATENT DOCUMENTS 3,773,373 A * 11/1973 McLauchian
3,880,455 A * 4/1975 Toemmeraase ......... 293/155 X
4,272,115 A * 6/1981 Stock ..................... 293/155
4,943,085 A * 7/1990 Straka .................... 293/128 X
4,961,603 A * 10/1990 Carpenter ............... 293/155 X

FOREIGN PATENT DOCUMENTS

| JP | 4-31152 | 2/1992 |
| JP | 4-287742 | 10/1992 |
| JP | 11-34913 | 2/1999 |

* cited by examiner

Primary Examiner—Dennis H. Pedder
(74) Attorney, Agent, or Firm—McDermott, Will & Emery

(57) ABSTRACT

An improvement on a vehicle body is provided which includes bumper brackets joining a bumper reinforcement to ends of side members extending longitudinally of the vehicle body. Each of the bumper brackets has a boss. The boss has formed therein a vertical hole extending vertically of the vehicle body and establishes a connection of the bumper reinforcement and a corresponding one of the side members through a bolt which is fitted within the vertical hole of the boss so as to allow the bumper bracket to rotate inwardly of the vehicle body within a given angular range when the impact acts on the bumper bracket upon occurrence of a font-end collision for ensuring transmission of axial collapsing pressure arising from the impact to the side members.

21 Claims, 21 Drawing Sheets

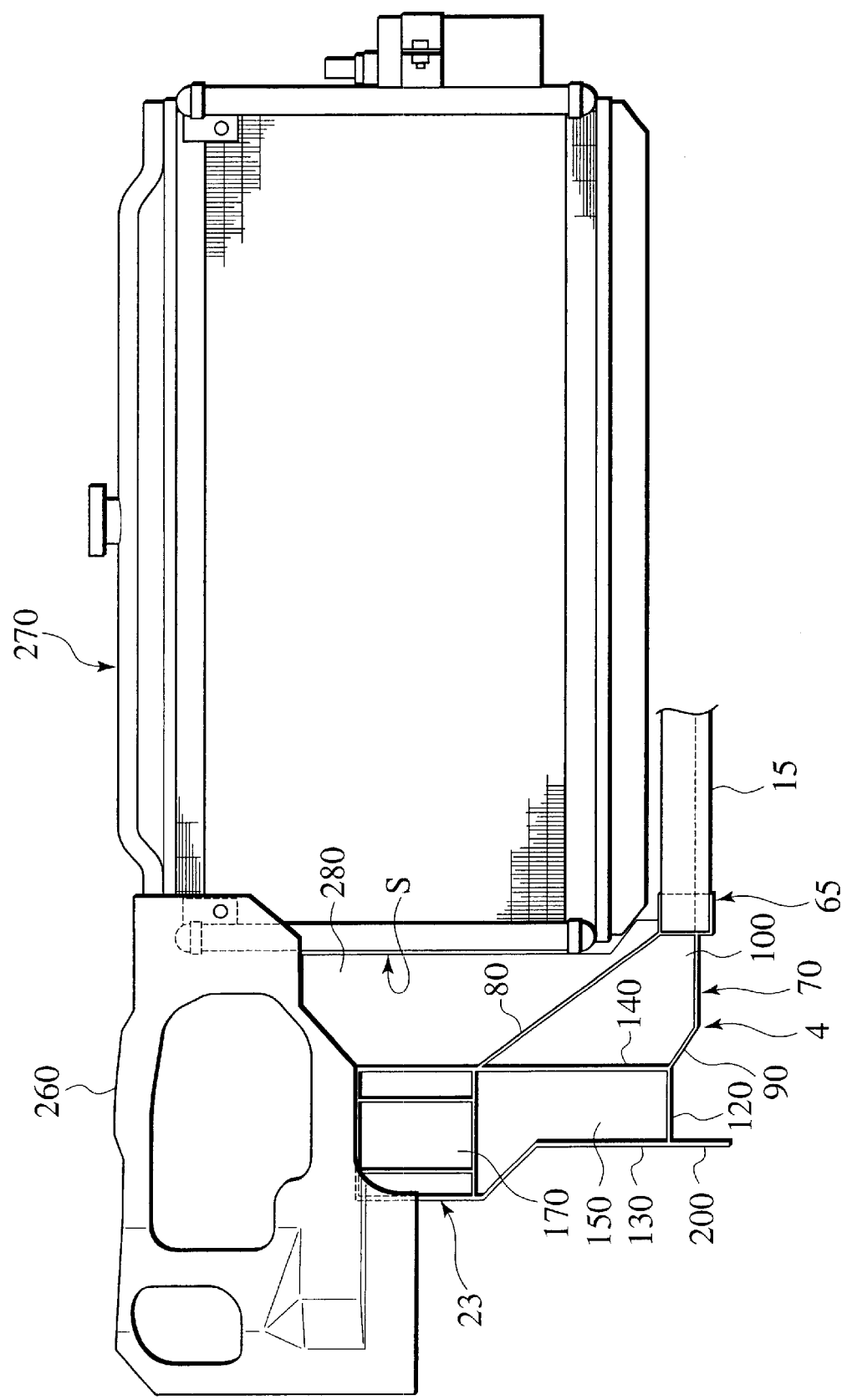

AUTOMOTIVE BUMPER MOUNT STRUCTURE

BACKGROUND OF THE INVENTION

1. Field Of The Invention

The present invention relates generally to a bumper mount structure for automotive vehicles.

2. Description Of Related Art

Japanese Patent Application Laid-open No. 4-31152 teaches an automotive bumper mount structure in which bumper brackets are mounted on the front of front side members through bumper stay reinforcements. When the vehicle is involved in a front-end collision, the front side members and the bumper brackets are collapsed in the longitudinal direction thereof to absorb the energy of impact.

Japanese Patent First Publication No. 4-287742 teaches another type of bumper mount structure in which a bumper stay is installed on each front side member using a bolt and a nut so that it may be turned upon occurrence of a vehicle collision to impinge on the front side member, thereby causing the moment produced from the bolt and the nut and the moment produced by the interference of the bumper stay with the front side member to be balanced to absorb the energy of impact effectively.

Usually, when the vehicle is involved in an offset collision, it will cause a bumper reinforcement to be bent, so that a side member and a bumper bracket on the side of the collision are collapsed longitudinally. The other side member is attracted inwardly to produce torsional moment which will cause a bumper bracket on the opposite side of the collision to be deformed.

At the instant of the offset collision, the side member on the opposite side of the collision will produce some reactive force, but the bending of the bumper reinforcement reduces the reactive force. It is, thus, important to avoid the bending of the bumper reinforcement by, for example, increasing the thickness thereof, however, resulting in a undesirable increase in weight.

In the latter structure in which the bumper stay is mounted rotatably by the bolt, the load of the bolt concentrates at the upper and lower ends of the bumper stay, thus requiring reinforcement of the ends of the bumper stay, which will lead to an increase in weight thereof.

SUMMARY OF THE INVENTION

It is an object of the present invention to provide a simple and light-weight bumper mount structure designed to minimize undesirable bending of a bumper bracket upon occurrence of an offset collision to transmit an axial collapsing pressure to a side member with high efficiency.

According to one aspect of the invention, there is provided a vehicle body which comprises: (a) side members disposed on sides of the vehicle body, the side member extending in a longitudinal direction of the vehicle body; (b) a bumper reinforcement; and (c) bumper brackets joining the bumper reinforcement to ends of the side members, respectively, each of the bumper bracket being made of one of an extruded material and a cast material and having a boss, the boss having formed therein a vertical hole extending vertically of the vehicle body and establishing connection of the bumper reinforcement and a corresponding one of the side members through a fastening member which is fitted within the vertical hole of the boss so as to allow the bumper bracket to rotate around the fastening member.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 33 is a front view which shows an improvement on a front structure of a vehicle body when a connecting member of the invention is used for keeping the performance of heat exchange of a radiator.

DESCRIPTION OF THE PREFERRED EMBODIMENTS

Figure 1:
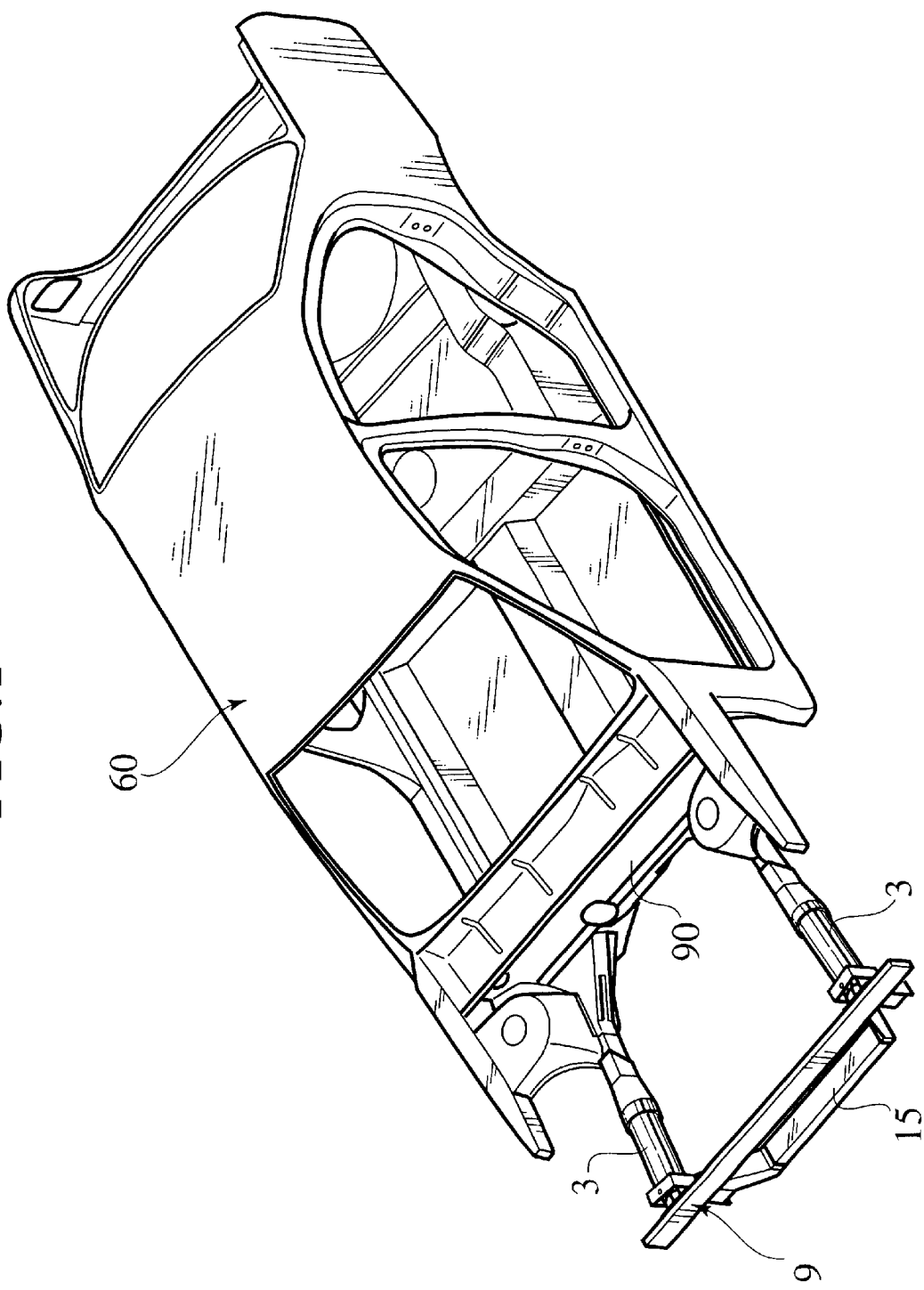
FIG. 1 is a perspective view which shows a vehicle body having a bumper mount structure according to the preset invention.
Figure 6:
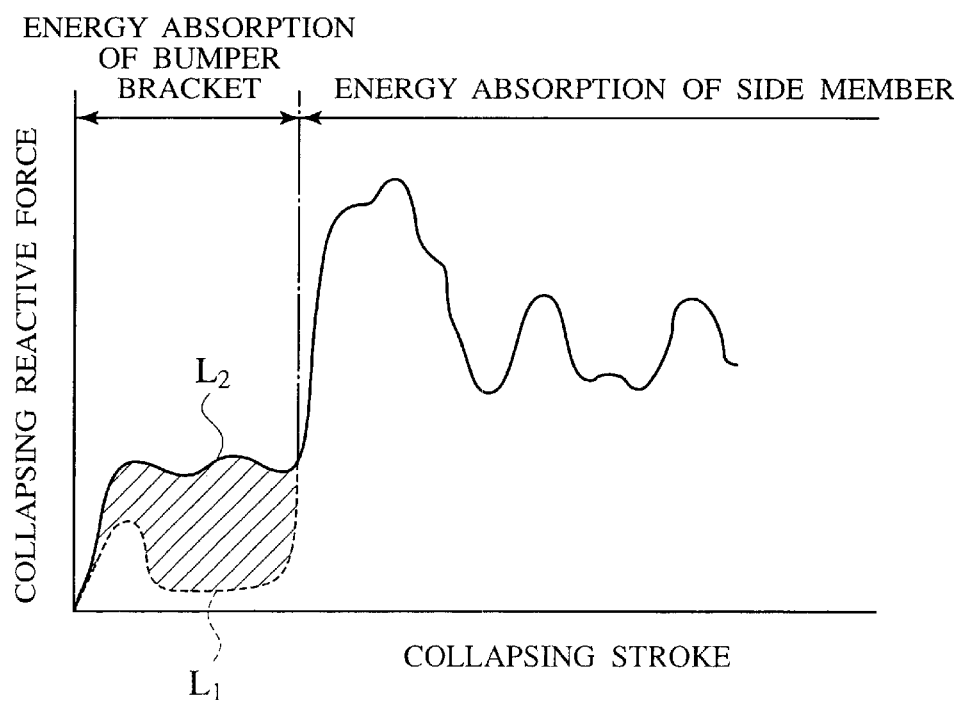
FIG. 6 shows the relation between a collapsing reactive force and a collapsing stroke.

Referring now to the drawings, wherein like numbers refer to like parts in several views, particularly to FIGS. 1 and 6, there is shown left and right bumper mounts for an automotive vehicle according to the invention.

The right and left front side members 3 extend longitudinally of the vehicle body 60 and are connected at front ends thereof by the extension cross member 15 through the connecting members 4.

The bumper reinforcement 9 is joined to the extension cross member 15 through left and right bumper brackets 5 and 7. The bumper brackets 5 and 7 are mounted on ends of the bumper reinforcement 9 which are bent inwardly of the vehicle body 60 at a given angle to the length of the bumper reinforcement 9. The connection of each of the bumper bracket 5 and 7 to the extension cross member 15 is achieved by installing the bolt 17 vertically and fastening a nut (not shown) from beneath the bolt 17.

Each of the bumper brackets 5 and 7 is made of an extruded material and has formed therein the boss 59 which has a vertical hole extending in the vertical direction of the vehicle body 60 and into which the bolt 17 is inserted. When a rotational force acts on a connection of each of the bumper brackets 5 and 7 to the extension cross member 15, it will cause the bolt 17 to impinge on the whole of the boss 59, allowing the one of the bumper brackets 5 and 7 to rotate inwardly of the vehicle body 60 around the axis of the bolt 17. Each of the bumper brackets 5 and 7 has a curved surface whose center lies at the bolt 17 and which is in contact with the extension cross member 15. This will be described below in detail with reference to FIG. 3.

Figure 3:
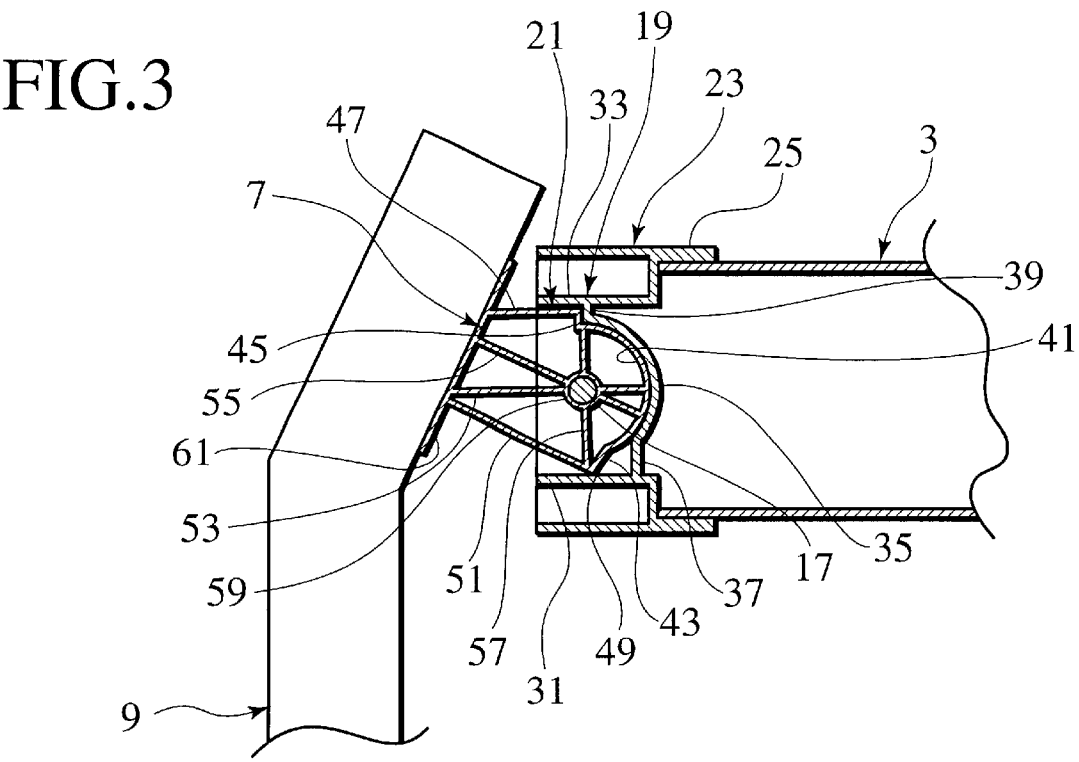
FIG. 3 is a horizontal sectional view which shows a bumper mount structure of the first embodiment.

FIG. 3 is a horizontal sectional view which shows a connection of a front end of the right front side member 3 to the bumper reinforcement 9 through the extension cross member 15. A connection of the left front side member 3 to the bumper reinforcement 9 has a symmetrical structure, and explanation thereof in detail will be omitted here for the brevity of disclosure.

Figure 2:
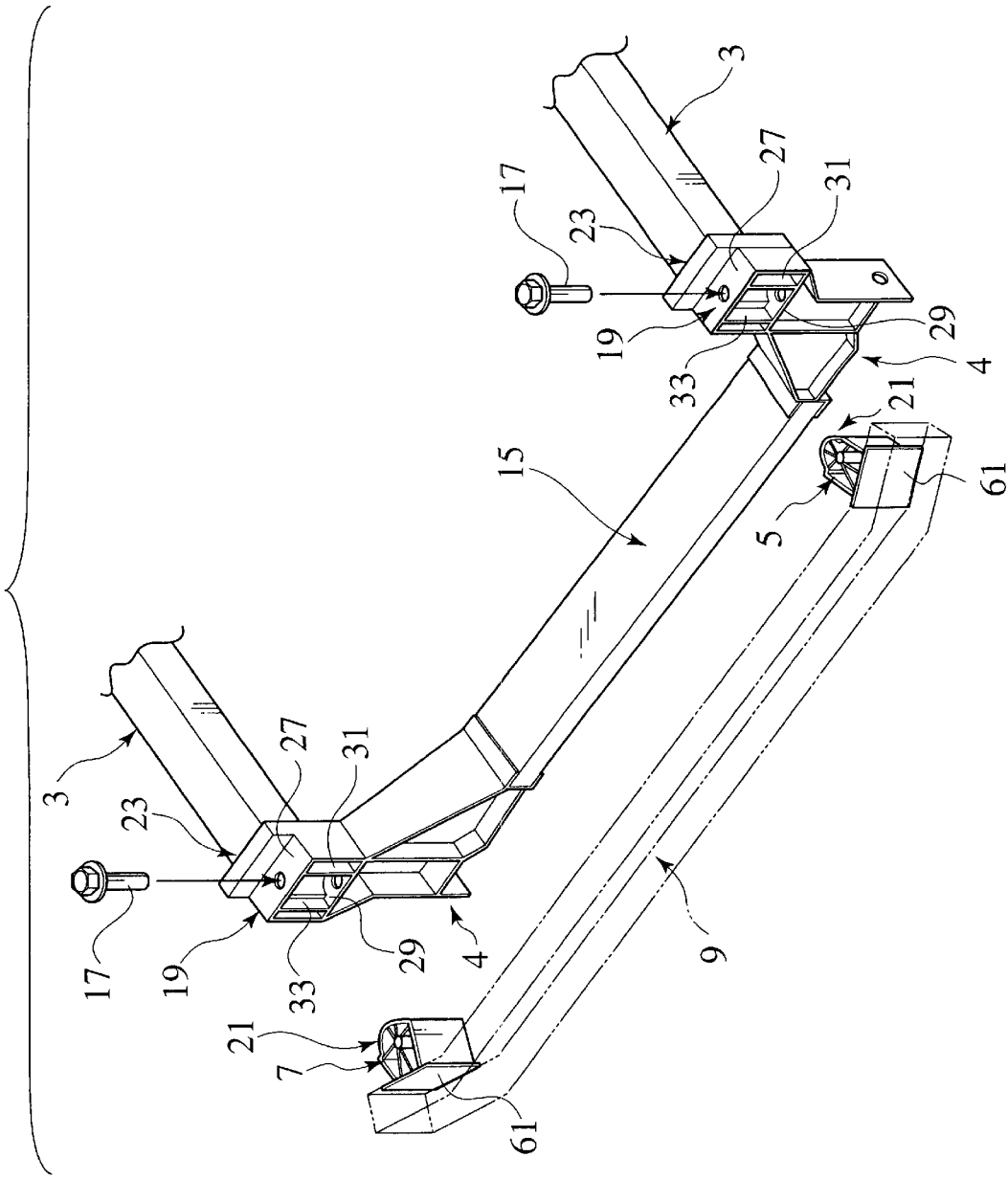
FIG. 2 is a partial perspective view which shows a bumper mount structure according to the first embodiment of the invention.

The extension cross member 15 has, as clearly shown in FIGS. 2 and 3, a box-like support 19 formed on an end thereof. The bumper bracket 7 has the joint portion 21. The box-like support 19 is provided in the bumper joint 23 formed at the end of the extension cross member 15. The bumper joint 23 has the hollow connection 25 formed in a rear portion thereof to which the end of the front side member 3 is welded.

The box-like support 19 includes, as shown in FIG. 2, the upper, lower, and side support walls 27, 29, 31, and 33. The upper and lower support walls 27 and 29 are formed by upper and lower walls of the bumper joint 23 of the extension cross member 15. The side support walls 31 and 33 extend vertically within the bumper joint 23. The box-like support 19 also has the curved vertical wall 35 formed therein which projects rearward of the side member 3. The curved vertical wall 35 has the curvature whose center lies at the axis of the bolt 17.

The box-like support 19 also includes the stopper wall 37 and the lock wall 39. The stopper wall 37 continues from the curved vertical wall 35 and extends inwardly in the widthwise direction of the vehicle body 60. The lock wall 39 extends from the curved vertical wall 35 outwardly in the width-wise direction of the vehicle body 60.

The joint portion 21 of the bumper bracket 7 has the height equal to the distance between the upper and lower support walls 27 and 29 of the box-like support 19 so that the joint portion 21 may be fitted within the box-like support 19 substantially in contact with the upper and lower support walls 27 and 29.

The joint portion 21 of the bumper bracket 7 has the bulgy vertical wall 41 and stopper walls 43 and 45. The bulgy vertical wall 41 projects rearward of the vehicle body 60 so that it is in constant contact with the curved vertical wall 35 of the box-like support 19. The stopper wall 43 extends inwardly from the bulgy vertical wall 41 and serves as a stopper which impinges on the stopper wall 37 of the box-like support 19 when the joint portion 21 experiences an inward rotation to restrain a further inward rotation of the joint portion 21. The stopper wall 45 extends outwardly from the bulgy vertical wall 41 and serves as a stopper which is in contact with the lock wall 39 to restrain an outward rotation of the joint portion 21.

The bumper bracket 7 also has at least one pair of walls or ribs extending longitudinally of the vehicle body 60 across the boss 59. Specifically, one of the ribs is so formed as to lie outside the boss 59 in the width-wise direction of the vehicle body 60, while the other rib is so formed as to lie inside the boss 59. Specifically, the bumper bracket 7 has five ribs: the front outside rib 47, the rear inside rib 49, the front inside rib 51, the intermediate ribs 53 and 55, and the horizontal rib 57. The intermediate ribs 53 and 55 and the horizontal rib 57 have formed in central portions thereof the boss 59. The intermediate ribs 53 and 55 extend between the mount plate 61 and the bulgy vertical wall 41 of the bumper bracket 5.

The front outside rib 47 extends, as clearly shown in FIG. 3, longitudinally of the vehicle body 60 and lies outside and in front of the bolt 17. The rear inside rib 49 extends, like the front outside rib 47, longitudinally of the vehicle body 60 and lies inside the bolt 17 in the widthwise and lengthwise directions of the vehicle-body 60. The front inside rib 51 is oriented longitudinally of the vehicle body 60 when the bumper bracket 7 is rotated fully in the inward direction so that it lies in front of and inside the bolt 17. The intermediate rib 53 is formed within an inner chamber of the bumper bracket 7 extends longitudinally of the vehicle body 60 and connects the mount plate 61, the boss 59, and the bulgy vertical wall 41. The intermediate rib 55 is oriented longitudinally of the vehicle body 60 when the bumper bracket 7 is rotated fully in the inward direction and connects the mount plate 61, the boss 59, and the bulgy vertical wall 41. The horizontal rib 57 connects the boss 59, an outer end of the bulgy vertical wall 41, and a rear end of the front inside rib 51.

The bumper bracket 7 is made of an extruded light metal such as aluminum alloy or magnesium alloy. The direction of the extrusion is oriented vertically of the vehicle body 60 for facilitating ease of formation of each rib. The mount plate 61 of each of the bumper brackets 5 and 7 is welded to the bumper reinforcement 9. A bumper made of a resinous material is attached to the bumper reinforcement 9.

The installation of the bumper brackets 5 and 7 in the box-like supports 19 of the bumper joints 23 of the extension cross member 15 is achieved, as shown in FIG. 3, by fitting the joint portions 21 of the bumper brackets 5 and 7 into the box-like supports 19 of the extension cross member 15, inserting the bolts 17, as shown in FIG. 2, into the bosses 59 of the joint portions 21 through mount holes of the box-like supports 19, and engaging nuts (not shown) with the bolts 17 or fastening the bolts 17 to nuts (not shown) welded on the lower surface of the support walls 29.

The structure in which the bumper brackets 5 and 7 are fitted into the box-like supports 19 provides for ease of installation of the bumper brackets 5 and 7 and the bumper reinforcement 9 on the side of the vehicle body 60. Particularly, the joint of each of the bumper brackets 5 and 7 to one of the box-like supports 19 is accomplished using the single bolt 17, thereby resulting in great ease of the installation and a decrease in parts.

The bolt 17 is disposed within the boss 59, so that the overall length of the bot 17 impinges on the inner wall of the boss 59 when the vehicle is involved in a collision, thereby causing the impact to be distributed over the whole of each of the brackets 5 and 7 without the local concentration of stress. Further, the boss 59 is supported physically by the intermediate ribs 53 and 55 which are connected to the bulgy vertical wall 41, thereby causing the impact to be distributed over the curved vertical wall 35 effectively.

Each of the bumper brackets 5 and 7 is supported at the upper and lower ends of the joint portion 21 by the upper and lower support walls 27 and 29 of the box-like support 19, thereby ensuring firm connection to the extension cross member 15 even if each of the bumper brackets 5 and 7 is installed in the box-like support 19 using the single bolt 17. When the joint portions 21 of the bumper brackets 5 and 7 are fitted into the box-like supports 19, the bulgy vertical wall 41 of the joint portion 21 of each of the bumper brackets 5 and 7 impinges on the curved vertical wall 35 of the box-like support 19, the front outside rib 47 slides on the support wall 33 of the box-like support 19, and the rear inside rib 49 slides on the support wall 31 of the box-like support 19, thereby offering easy positioning of the bumper brackets 5 and 7 in the box-like supports 19.

The impact transmission when the vehicle is involved in a front-end collision will be described below.

(Front End full Lap Collision)

The outward rotation of each of the bumper brackets 5 and 7 in the widthwise direction of the vehicle body 60 is detained or restricted by direct engagement of the stopper wall 45 with the lock wall 39, thereby holding the angular position thereof in the outward direction of the vehicle body 60. The outward rotation is also restricted by direct engagement of the front outside rib 47 of each of the bumper brackets 5 and 7 with the support wall 33 of the box-like support 19 of the extension cross member 15.

The status at the time of a front end full lap collision is, thus, the same as the one shown in FIG. 3. The impact acting on the bumper is transmitted through the front outside wall 47 and the intermediate rib 53 of each of the bumper brackets 5 and 7 and a contact area between the bulgy vertical wall 41 and the curved vertical wall 35 to the bumper joint 23 of the extension cross member 15. The impact is subsequently transmitted from the bumper joint 23 to a corresponding one of the front side members 3. The energy of the impact is, thus, absorbed by an axial collapse of the bumper brackets 5 and 7, the bumper joints 23 of the extension cross member 15, and the front side members 3 greatly as compared with the conventional structure.

The horizontal rib 57 provides the rigidity to each of the bumper brackets 5 and 7 to withstand lateral deformation thereof in the widthwise direction of the vehicle body 60, thereby ensuring the engagement of the stopper wall 45 with the lock wall 39.

(Light Offset Collision)

Figure 4:
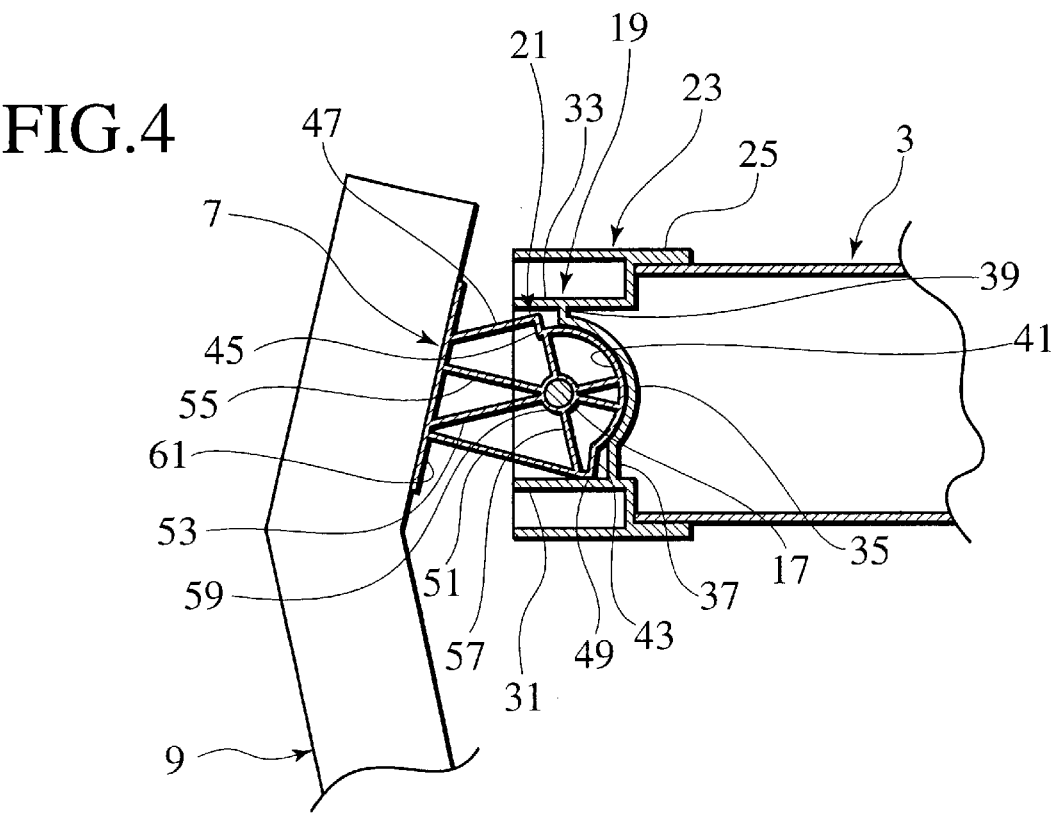
FIG. 4 is a horizontal sectional view which shows a bumper mount structure on the opposite side of a vehicle body on which impact acts upon occurrence of an light offset collision.

If the vehicle is involved in a light offset collision, the amount of an axial collapse of a portion of the vehicle on which the impact acts is not very great. The bumper reinforcement 9 is bent slightly, so that one of the bumper brackets 5 and 7 on the opposite side of the collision, e.g., the bumper bracket 7 is attracted slightly to the side of the collision and turned, as shown in FIG. 4, around the bolt 17 inwardly. Most of the impact acting on the bumper bracket 7 is received by the intermediate rib 53 which extends in the longitudinal direction of the vehicle body 60 before the collision and the intermediate rib 55 of the bumper bracket 7 which is oriented in the longitudinal direction of the vehicle body 60 after the bumper bracket 7 is turned by the collision and then transmitted through the bulgy vertical wall 41 and the curved vertical wall 35 to the bumper joint 23 of the extension cross member 15. The energy of the impact is, thus, absorbed by an axial collapse of the front side member 3, the bumper joint 23 of the extension cross member 15, and the bumper bracket 7.

(Offset Collision)

Figure 5:
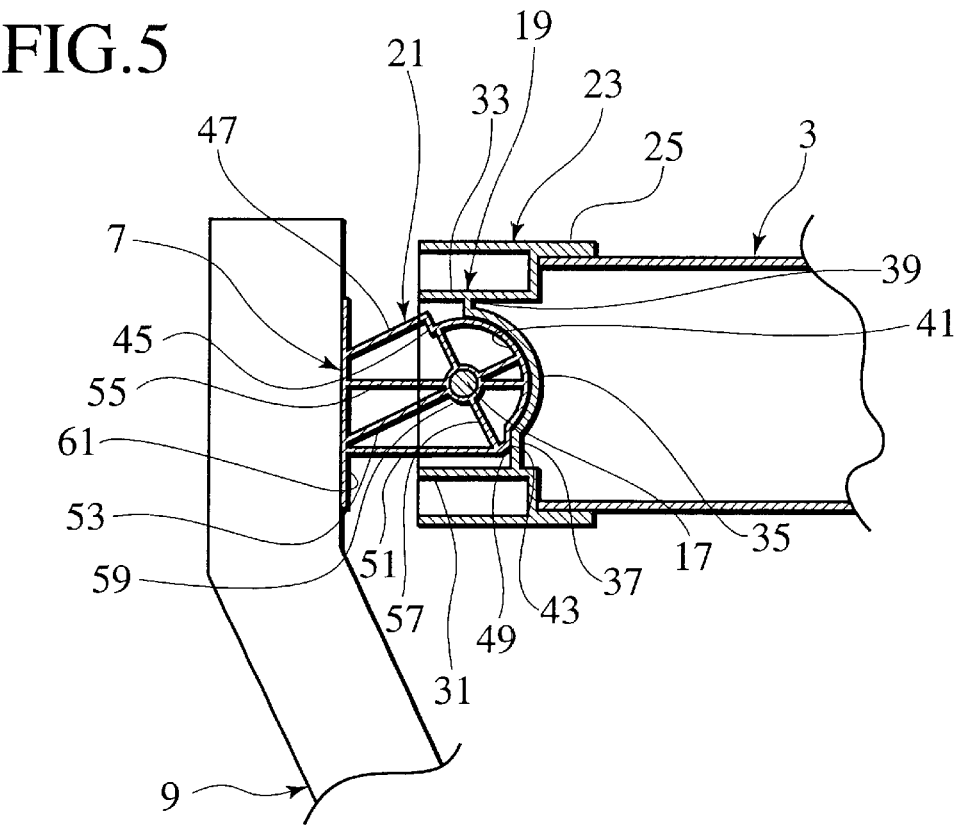
FIG. 5 is a horizontal sectional view which shows a bumper mount structure on the opposite side of a vehicle body on which impact acts upon occurrence of an offset collision.

The offset collision will cause the bumper reinforcement 9 to be bent greatly, so that one of the bumper brackets 5 and 7 on the opposite side of the collision, e.g., the bumper bracket 7 is attracted greatly, as shown in FIG. 5, to the side of the collision and turned around the bolt 17 inwardly. Specifically, the joint portion 21 of the bumper bracket 7 is turned inwardly until of the stopper wall 43 strikes on the stopper wall 37 of the box-like support 19. Simultaneously, the front inside rib 51 strikes on the support wall 31 of the box-like support 19, thereby avoiding further movement of the bumper bracket 7.

Most of the impact acting on the bumper bracket 7 is received by the intermediate rib 55 and the front inside rib 51 which are oriented in the longitudinal direction of the vehicle body 60 after the collision and transmitted to the front side member 3 through the contact area between the bulgy vertical wall 41 and the curved vertical wall 35.

Even if the ribs 47, 51, 53, and 55 are inclined to the longitudinal center line of the vehicle body, they may serve to transmit the impact to the front side members 3 effectively.

The extension cross member 15 is joined perpendicular to the sectional areas of the front side members 3, thereby causing the impact acting on the extension cross member 15 to be transmitted as longitudinal collapsing pressure to the left and right front side members 3 effectively.

The impact absorption on the opposite side of the offset collision will be discussed below with reference to FIG. 6.

FIG. 6 shows the relation between a collapsing stroke and a collapsing reactive force. Upon occurrence of a collision, the vehicle body 60 is, as described above, deformed. At the instant of an offset collision, the bumper reinforcement 9 is bent, causing one of the bumper brackets 5 and 7 on the opposite side of the collision, for example, the bumper bracket 7 to be attracted to the bumper reinforcement 9, so that it is turned around the longitudinal axis of the bolt 17. Simultaneously, the front inside rib 51 and the intermediate rib 55 begin to collapse, thereby producing a collapsing stroke. Specifically, upon occurrence of the offset collision, the impact is first absorbed by the front inside rib 51 and the intermediate rib 55 on the opposite side of the collision. The front inside rib 51 and the intermediate rib 55 are oriented in the longitudinal direction of the vehicle body 60, so that they are subjected to the axial collapsing pressure, thus resulting in generation of a relatively great reactive force which is not decreased suddenly. After completion of absorption of the impact acting on the bumper bracket 7, the reactive force is produced in the front side member 3.

Specifically, the bumper mount structure of this embodiment enables the moment acting on the front side member 3 on the opposite side of the offset collision to be reduced greatly through the bumper bracket 7 and also minimizes the deformation of the bumper bracket 7. The impact is distributed over the curved vertical wall 35 and transmitted to the front side member 3 as the axial collapsing pressure.

In a conventional structure in which the above rotational measures and other wall thickness measures are not taken, when an offset collision occurs, it will cause a bumper bracket to be attracted to a bumper reinforcement. The bumper bracket is not bent greatly at the instant of the offset collision, so that the collapsing reactive force rises temporarily, as indicated by a broken line in FIG. 5, but it may drop along a curved broken segment L1 with the progress of bending of the bumper bracket. In contrast, each of the bumper brackets 5 and 7 of this invention is turned by the offset collision, so that the collapsing reactive force is, as indicated by the solid line L2, not decreased. Specifically, the collapsing reactive force is increased by an amount, as indicated by hatched lines, as compared with that in the conventional structure. This enables great energy absorption on the opposite side of the offset collision.

The bumper bracket 5 and the front side member 3 on the side of the offset collision are collapsed greatly, thereby absorbing the energy of the impact completely. Therefore, the bumper mount structure of this embodiment as a whole ensures great absorption of the impact energy.

The bumper reinforcement 9 has, as clearly shown in FIG. 2, end portions bent rearwards of the vehicle body 60. When the bumper reinforcement 9 is rotated inwardly of the vehicle body 60, the bent end portions are shifted in a direction of the extension, thereby facilitating the rotation.

Figure 7:
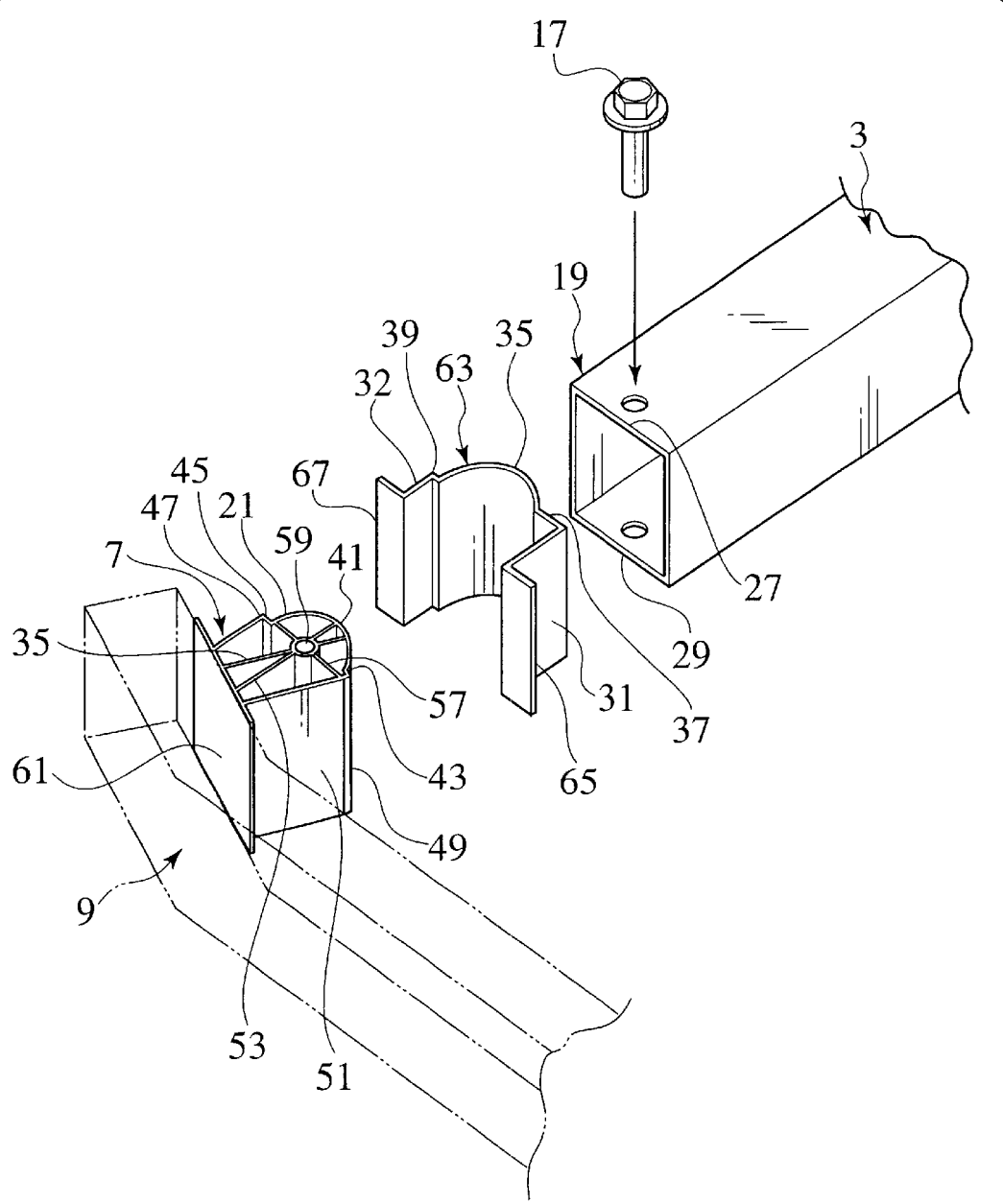
FIG. 7 is an exploded perspective view which shows a modification of a bumper mount structure of the first embodiment.
Figure 8:
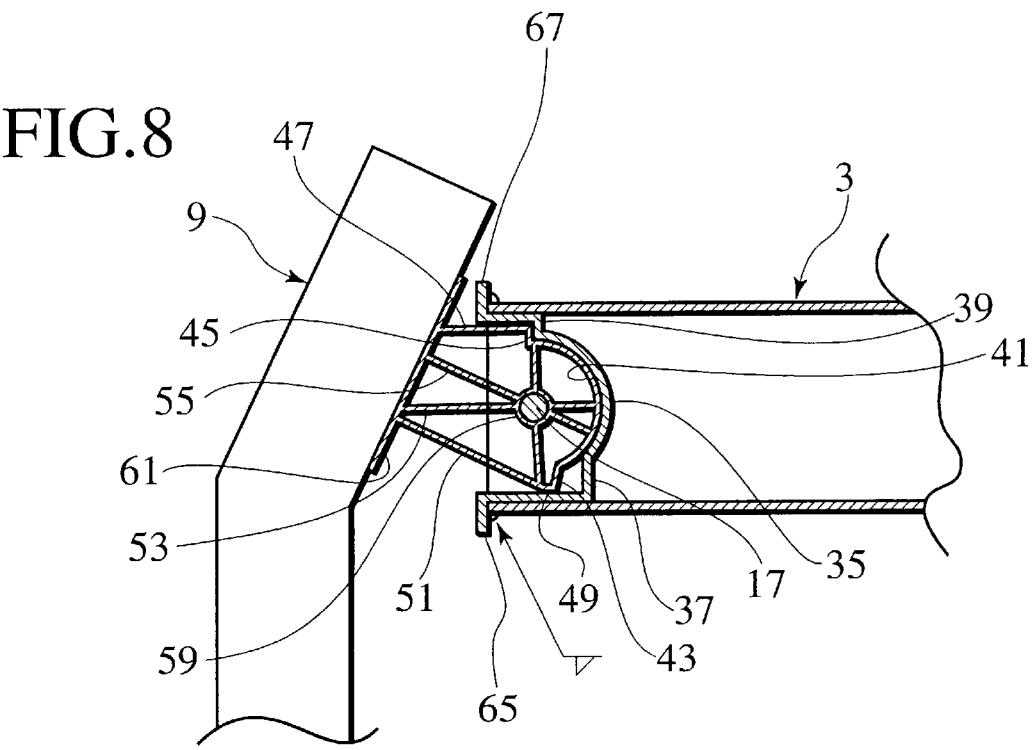
FIG. 8 is a horizontal sectional view which shows the modification of FIG. 7.

FIGS. 7 and 8 shows a modification of the first embodiment. FIG. 6 which is different from the one shown in FIGS. 2 and 3 in that the box-like support 19 includes the semi-cylindrical plate 63 fitted in an end portion of each of the front side members 3.

The semi-cylindrical plate 63 may be made by a press and has the curved vertical wall 35 and the side support walls 31 and 32. The side support walls 31 and 32 have the flanges 65 and 67, respectively. Each of the front side members 3 (only the right front side member 3 is shown for the brevity of illustration) has formed on the end thereof the upper and lower support walls 27 and 29 of the box-like support 19. The semi-cylindrical plate 63 is, as clearly shown in FIG. 8, fitted within the end of the front side member 3 with the flanges 65 and 67 welded to the side walls of the front side member 3.

This modification offers substantially the same effects as those in the above first embodiment. The side support walls 31 and 32 abut directly on the end of the front side member 3, thereby increasing the strength thereof.

Figure 9:
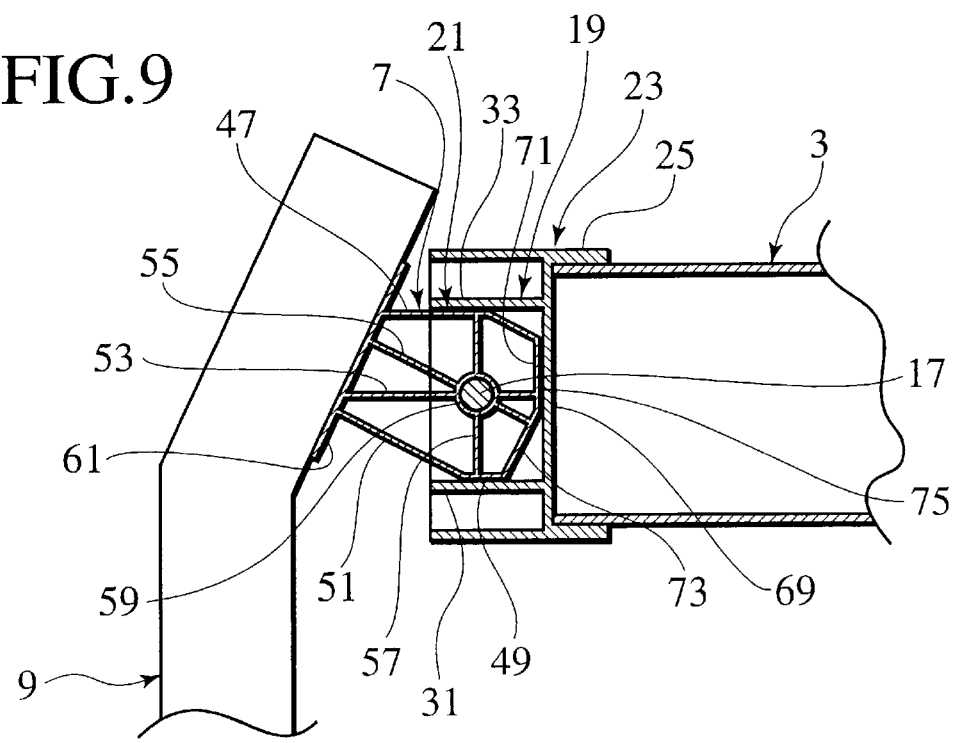
FIG. 9 is a horizontal sectional view which shows a bumper mount structure according to the second embodiment of the invention.
Figure 10:
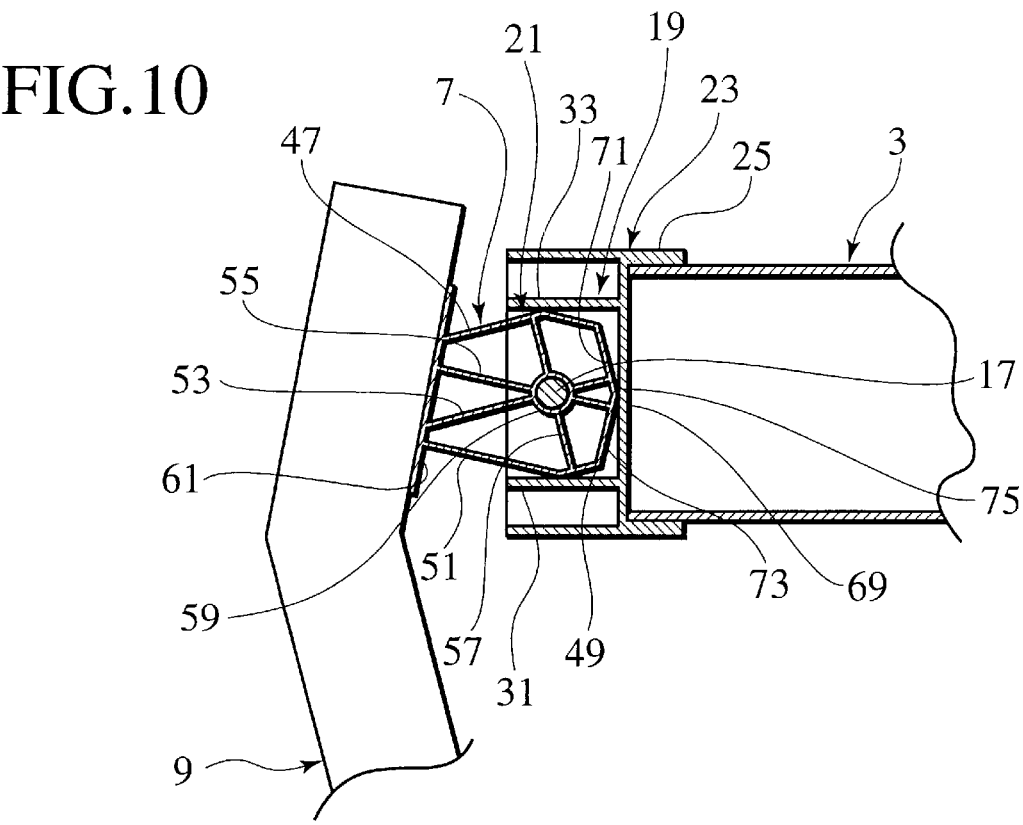
FIG. 10 is a horizontal sectional view which shows a bumper mount structure of the second embodiment on the opposite side of a vehicle body on which impact acts upon occurrence of an light offset collision.
Figure 11:
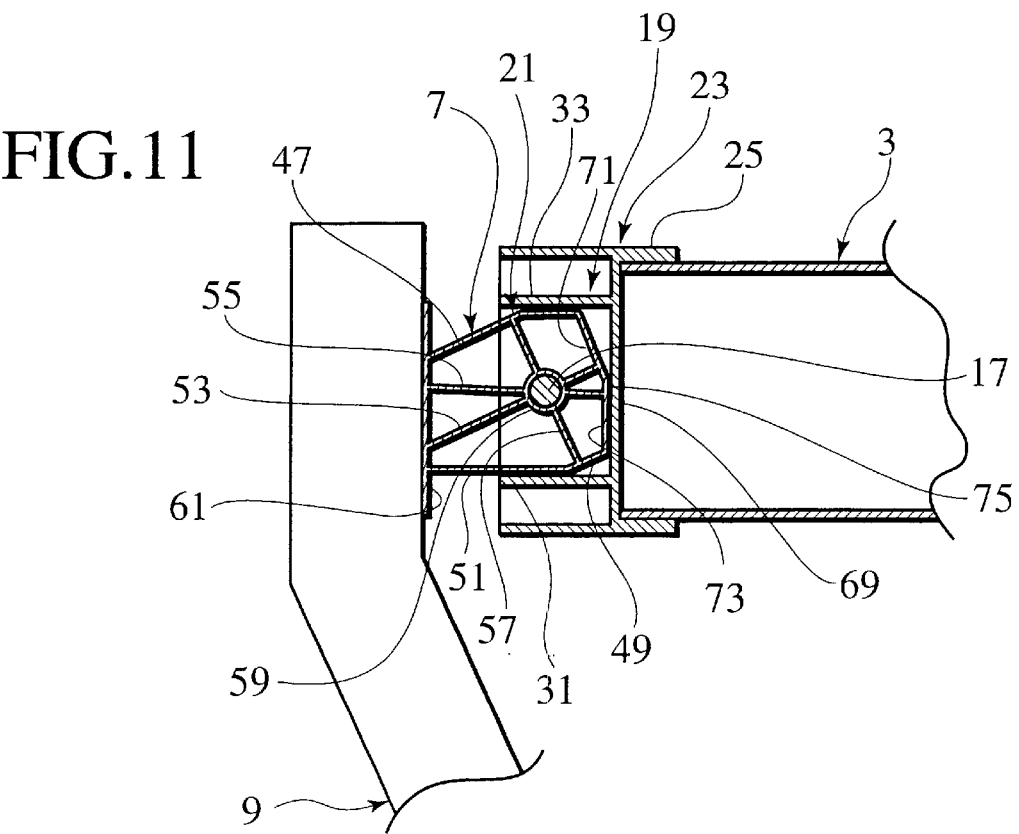
FIG. 11 is a horizontal sectional view which shows a bumper mount structure of the second embodiment on the opposite side of a vehicle body on which impact acts upon occurrence of an offset collision.

FIGS. 9 to 11 show a bumper mount according to the second embodiment of the invention. The same reference numbers as employed in the first embodiment refer to the same parts, and explanation thereof in detail will be omitted here.

The box-like support 19 has the flat vertical wall 69 formed on the rear sides of the support walls 27, 29, 31, and 33. Other arrangements are identical with that of the first embodiment. The joint portion 21 of the bumper bracket 7 is of a polygonal shape and includes the flat contact walls 71 and 73. The flat contact wall 71 is in constant contact with the flat vertical wall 69. The flat contact wall 73 is brought into contact with the flat vertical wall 69 upon inward rotation of the bumper bracket 7. The symmetrical bumper mount structure is provided for the left front side member 3.

(Front End Full Lap Collision)

Upon occurrence of a front end full lap collision, the bumper bracket 7 is in a state, as shown in FIG. 9. Most of the impact is received by the front outside rib 47 and the intermediate rib 53 of the bumper bracket 7 extending in the longitudinal direction of the vehicle body 60 and transmitted to the front side member 3 through the flat contact wall 71 of the bumper bracket 7 and the flat vertical wall 69 of the bumper joint 23 of the extension cross member 15. The energy of the impact is, thus, absorbed greatly, like the first embodiment, by the collapse of the bumper bracket 7 and the front side member 3 in the longitudinal direction of the vehicle body 60.

(Light Offset Collision)

If the vehicle is involved in a light offset collision on the side of the bumper bracket 1, the bumper bracket 7 on the opposite side of the collision is, as shown in FIG. 10, turned slightly. Most of the impact acting on the bumper bracket 7 is transmitted through the intermediate ribs 53 and 55 to the top wall 75 of the joint portion 21 and to the flat vertical wall 69 of the box-like support 19. The energy of the impact is, thus, absorbed by an axial collapse of the bumper bracket 7 and the front side member 3 completely.

(Offset Collision)

The offset collision will cause the bumper reinforcement 9 to be bent greatly, so that one of the bumper brackets 5 and 7 on the opposite side of the collision, e.g., the bumper bracket 7 is attracted greatly, as shown in FIG. 11, to the side of the collision and turned around the bolt 17 inwardly.

Most of the impact acting on the bumper bracket 7 is received by the intermediate rib 55 and the front inside rib 51 of the bumper bracket 7 which are oriented in the longitudinal direction of the vehicle body 60 after the collision and transmitted to the front side member 3 through the contact area between the flat contact wall 73 and the flat vertical wall 69. Specifically, the impact is transmitted from the bumper joint 23 of the extension cross member 15 to the front side member 3. The collapse of the bumper bracket 7 and the front side member 3 absorbs most of the energy of the impact.

Figure 12:
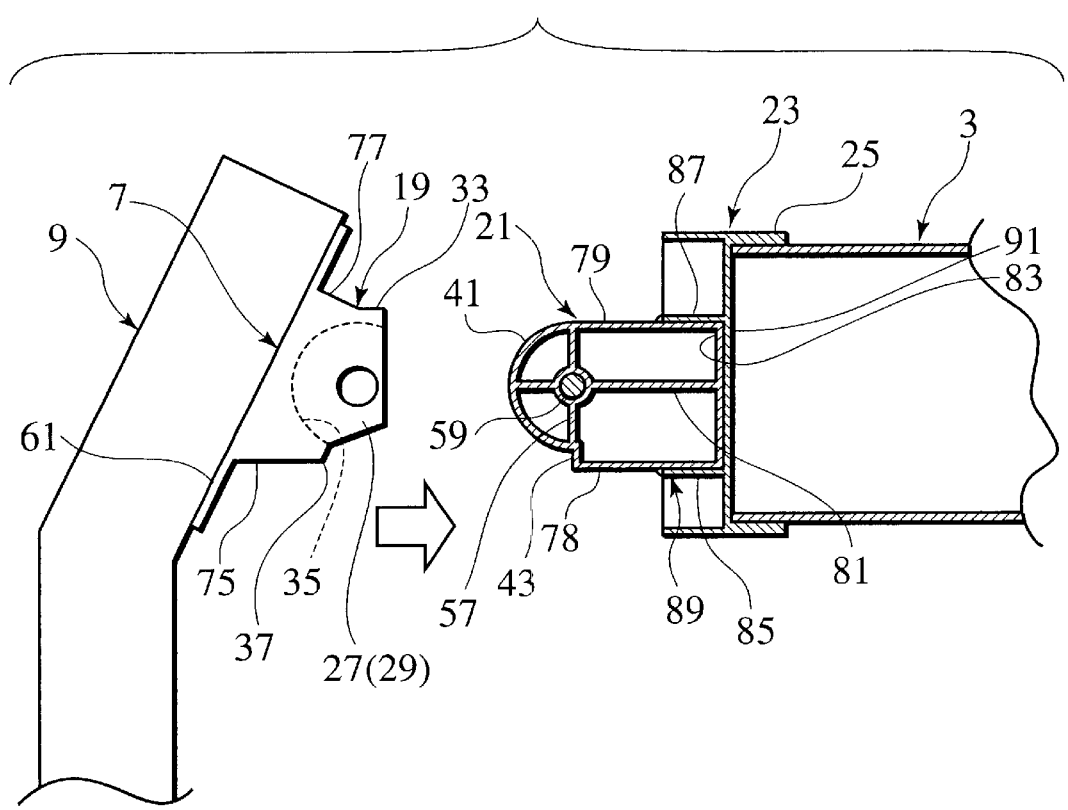
FIG. 12 is an exploded horizontal sectional view which shows a bumper mount structure according to the third embodiment of the invention.
Figure 13:
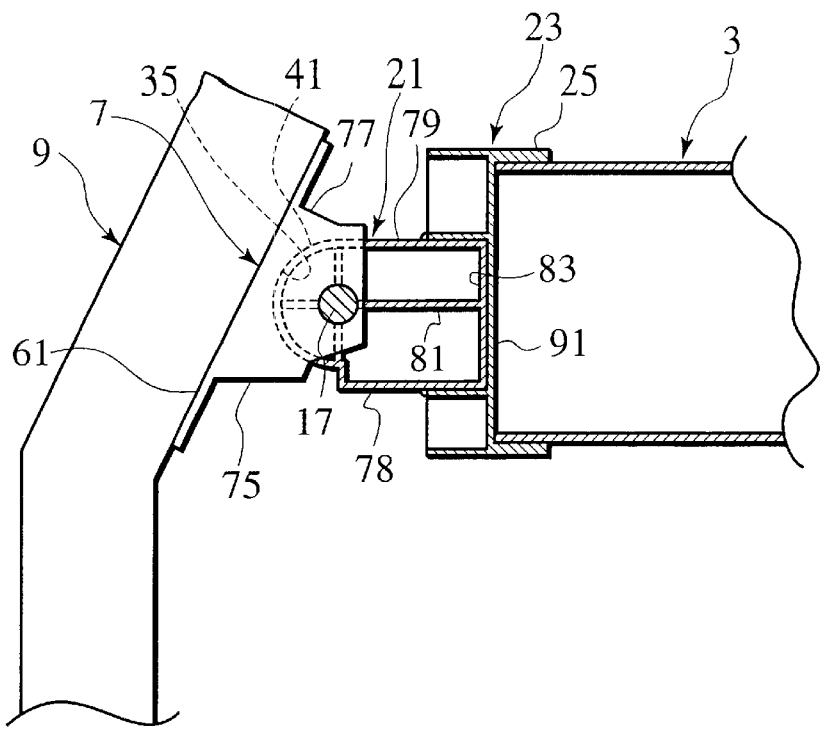
FIG. 13 is a horizontal sectional view which shows the bumper mount structure of FIG. 12.
Figure 14:
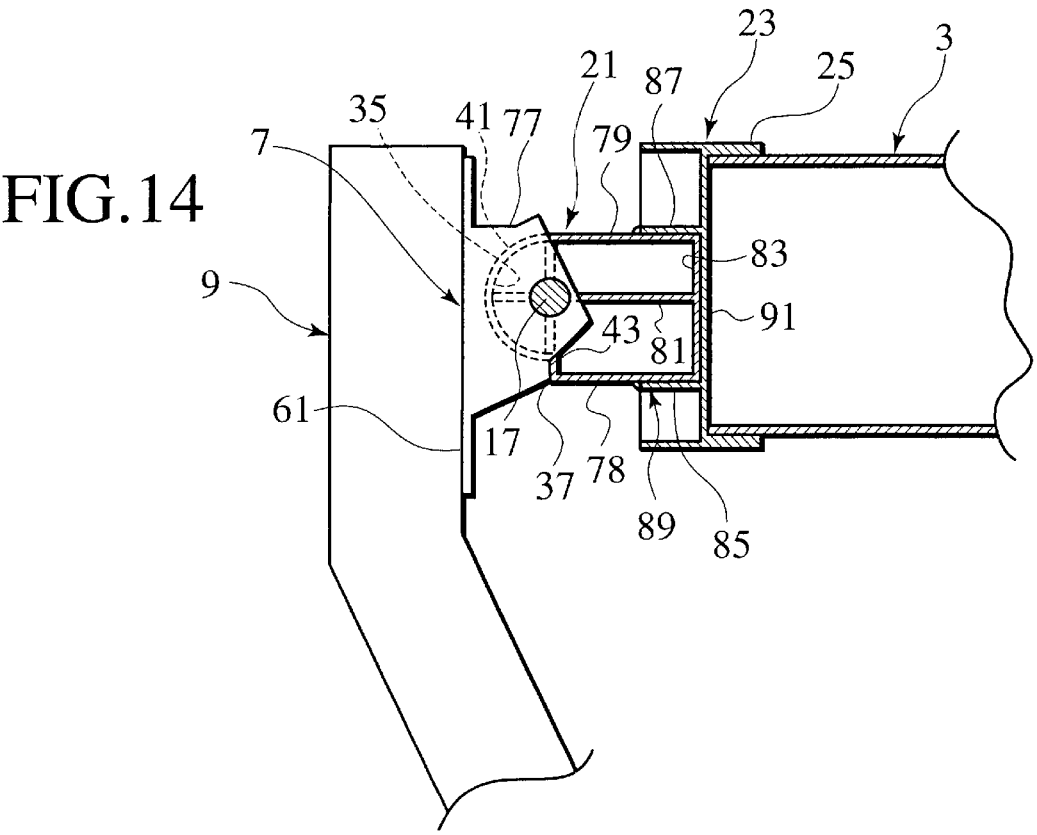
FIG. 14 is a horizontal sectional view which shows a bumper mount structure of the third embodiment on the opposite side of a vehicle body on which impact acts upon occurrence of an offset collision.

FIGS. 12 to 14 shows a bumper mount according to the third embodiment of the invention. The same reference numbers as employed in the first embodiment refer to the same parts, and explanation thereof in detail will be omitted here.

The bumper bracket 7 includes the box-like support 19. The joint portion 21 is installed on the bumper joint 23 of the extension cross member 15. The box-like support 19 has the upper and lower support walls 27 and 29 (only the wall 27 is shown in the drawings), the side support wall 33, and the curved vertical wall 35 projecting inwardly. The bumper bracket 7 also includes the side walls 75 and 77. The side wall 75 extends in the longitudinal direction of the vehicle body 60.

The joint portion 21 is disposed in a chamber or socket defined by the upper and lower support walls 27 and 29 and the side support wall 33 and has the bulgy vertical wall 41 in constant contact with the curved vertical wall 35 of the box-like support 19. The joint portion 21 includes the side walls 78 and 79 and the inner wall 81 which extend in the longitudinal direction of the vehicle body 60 and the flat rear wall 83 extending in the widthwise direction of the vehicle body 60. The joint portion 2 is made of an extruded light metal such as aluminum alloy or magnesium alloy. The direction of such extrusion is oriented in the vertical direction of the vehicle body 60.

The joint portion 21 is fixed on the bumper joint 23 of the extension cross member 15, so that the side walls 78 and 79 and the inner wall 81 are always oriented in the longitudinal direction of the vehicle body 60. The rear of the joint portion 21 is fitted within the socket 89 defined by the inner side walls 85 and 87, upper and lower walls (not shown), and the flat bottom wall 91 by welding. The flat bottom wall 91 extend laterally of the vehicle body 60 and is constant contact with the rear wall 83 of the joint portion 21.

The connection of the bumper bracket 7 to the extension cross member 15 is achieved by fitting the box-like support 19 in the joint portion 21 of the bumper joint 23, inserting the bolt 17 into the boss 59 of the joint portion 21 through holes in the box-like support 19, and fastening the bolt 17 using a nut (not shown).

The stopper wall 37 is formed by the rear of the side wall 75 of the bumper bracket 7 and brought into engagement with the stopper wall 43 of the joint portion 21 when the bumper bracket 7 is rotated inwardly upon occurrence of a vehicle collision.

(Full Lap Collision)

When the vehicle is involved in a full lap collision, the bumper bracket 7 is in a state, as shown in FIG. 13. The impact is transmitted from the bumper bracket 7 to the bumper joint 24 through the contact area between the curved vertical wall 35 and the bulgy vertical wall 41. The impact is subsequently transmitted through the side walls 78 and 79, the inner wall 81, and the contact area between the rear wall 83 and the flat bottom wall 91 of the bumper joint 23 to the front side member 3. The energy of the impact is, thus, absorbed greatly, like the first embodiment, by the collapse of the bumper bracket 7, the joint portion 21, and the front side member 3 in the longitudinal direction of the vehicle body 60.

(Offset Collision)

The offset collision will cause the bumper reinforcement 9 to be bent greatly, as shown in FIG. 14, so that one of the bumper brackets 5 and 7 on the opposite side of the collision, e.g., the bumper bracket 7 is attracted greatly to the side of the collision and turned around the bolt 17 inwardly. The rotation of the bumper bracket 7 causes the stopper wall 37 to strike against the stopper wall 43 to restrain the bumper bracket 7 from rotating further. The physical and locational relation among the curved vertical wall 35, the bulgy vertical wall 41, the side walls 78 and 79 and the inner wall 81 of the joint portion 21 is kept, thus ensuring the great absorption of energy of the impact.

A connection of the left front side member 3 to the bumper reinforcement 9 has a symmetrical structure, and explanation thereof in detail will be omitted here for the brevity of disclosure. The bumper brackets 5 and 7 may alternatively be made of a light metal or cast in other materials for facilitating ease of formation of the complex configuration thereof.

The right and left front side members 3 are, as shown in FIG. 2, connected at the front ends thereof to the extension cross member 15 through the connecting members 4. The connecting members 4 are cast in the same material as that of the front side members 3 and the extension cross member 15.

Each of the connecting member 4 includes the bumper joint 23, the cross member joint 65 connecting with the end of the extension cross member 15, and the bridge joint 70 connecting the bumper joint 23 and the cross member joint 65.

Figure 17:
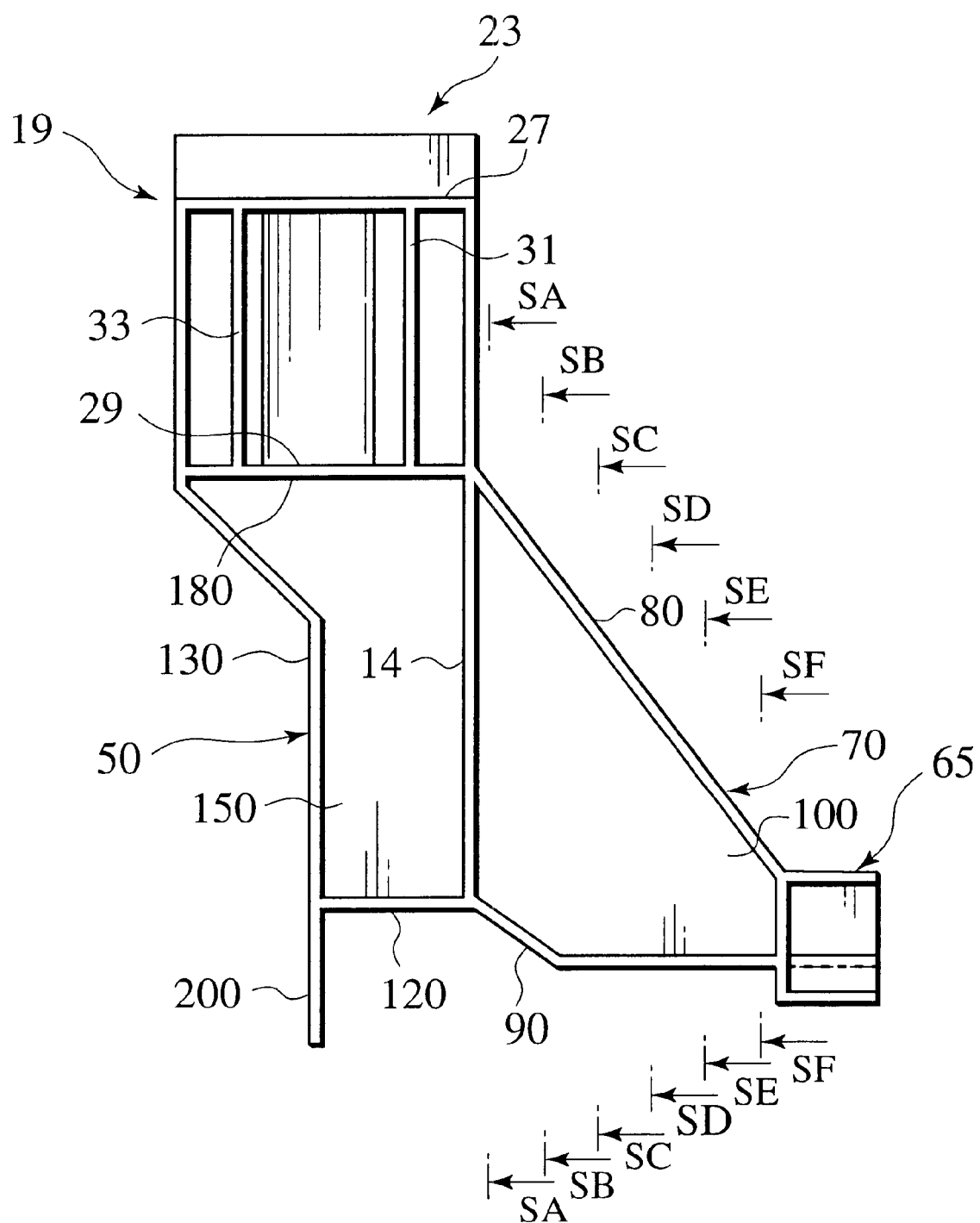
FIG. 17 is a front view which shows a connecting member.
Figure 18:
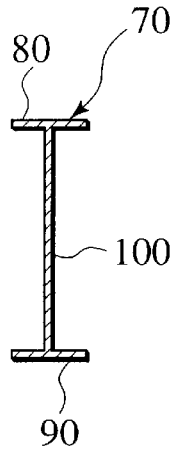
FIGS. 18, 19, 20, 21, 22, and 23 are vertical sectional views taken along the lines SA—SA, SB—SB, SC—SC, SD—SD, SE—SE, and SF—SF of FIG. 17.
Figure 19:
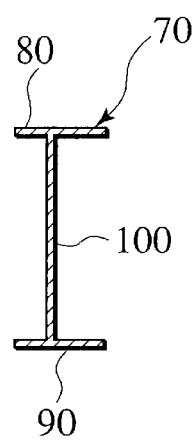
Figure 20:
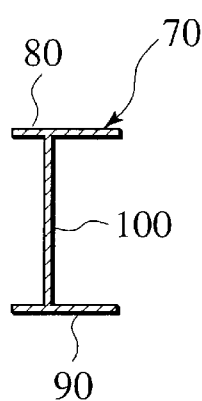
Figure 21:
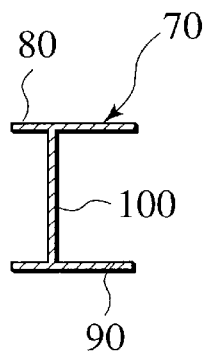
Figure 22:
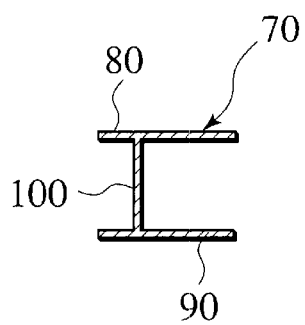
Figure 23:
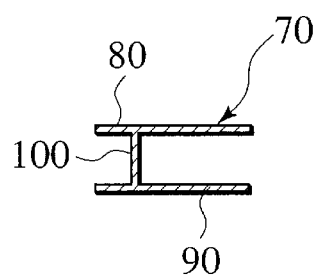

The bridge joint 70 includes the upper wall 80, the lower wall 90, and the rib 100. The upper wall 80 has the width which increases as approaching inwardly of the vehicle body 60 and slants at a given angle to the extension cross member 15 to connect the upper side wall of the bumper joint 23 and the upper corner of the cross member joint 65. The lower wall 90 has substantially the same projected area as that of the upper wall 80 and extends horizontally to connect the lower wall 120 of the bumper joint 23 and the lower wall of the cross member joint 65. The rib 100 is made of substantially a triangular plate which extends vertically from the lower wall 90 to the upper wall 80 and connects with the side walls of the bumper joint 23 and the cross member joint 65. Specifically, the rib 100 closes an opening defined by the upper and lower walls 80 and 90 and the side walls of the bumper joint 23 and the cross member joint 65 and forms an I-shaped cross section, as shown in FIGS. 18 to 23, together with the upper and lower walls 70 and 90. FIGS. 18 to 23 show sectional areas taken along the lines SA—SA, SB—SB, SC—SC, SD—SD, SE—SE, and SF—SF in FIG. 17, respectively.

The bumper joint 23 also includes the vertical side walls 140 and 150 extending from the lower wall 120 to the bottom of the box-like support 19 and the rib 150. The rib 150 is made of a plate and connected to inner surfaces of the vertical side walls 140 and 150 and the lower wall 120, and the bottom of the box-like support 19.

Figure 24:
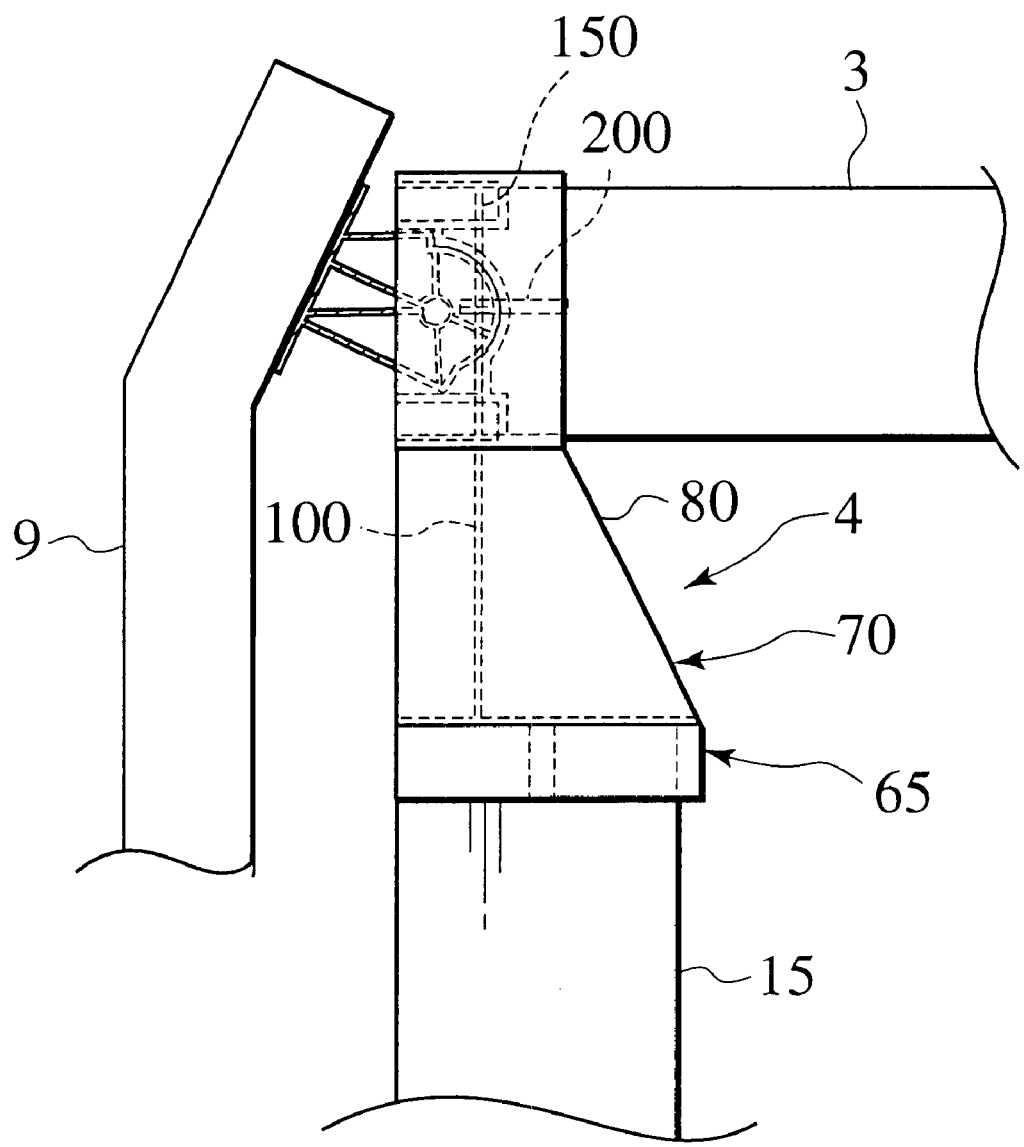
FIG. 24 is a plan view which shows a connecting member.

The rib 150 is formed in alignment with the rib 100 of the bridge joint 70 in the widthwise direction of the vehicle body 60. In the case where the box-like support 19 has the structure, as shown in FIGS. 9 to 11, the rib 150 extends in alignment with the flat vertical wall 69. Specifically, the front chamber or socket of the box-like support 19 into which the joint portion 21 of the bumper bracket 7 is fitted and the rear chamber or socket (i.e., the hollow connection 25) into which the end of each of the front side members 3 is fitted are formed across the rib 150 in the longitudinal direction of the vehicle body 60. The outer ends of the upper and lower walls 80 and 90 connecting with the vertical side wall 140 have the same width as that of the vertical side wall 140, while the inner ends thereof have the same width as that of the cross member joint 65. The front end surface of the connecting member 4 is, as clearly shown in FIG. 24, flush with the front end surface of the extension cross member 15.

A lower portion of the side wall 130 of the bumper joint 23 extends vertically in coincidence with the longitudinal center line of the front side member 3 as viewed vertically. The side wall 130 has the tie-down 200 extending downward from the lower wall 120.

The cross member joint 65 is made of a rectangular hollow member conforming with the external form of the end of the extension cross member 15. The extension cross member 15 is fitted within the cross member joint 65 and welded thereto.

The connecting member 4, as described above, has the bridge joint 70 which consists of the diagonally extending upper wall 80, the horizontally extending lower wall 90, and the vertically extending rib 100 and has the I-shaped cross section, thereby resulting in an increase in strength or rigidity resistant to impacts acting from vertical, longitudinal, and lateral directions.

Figure 15:
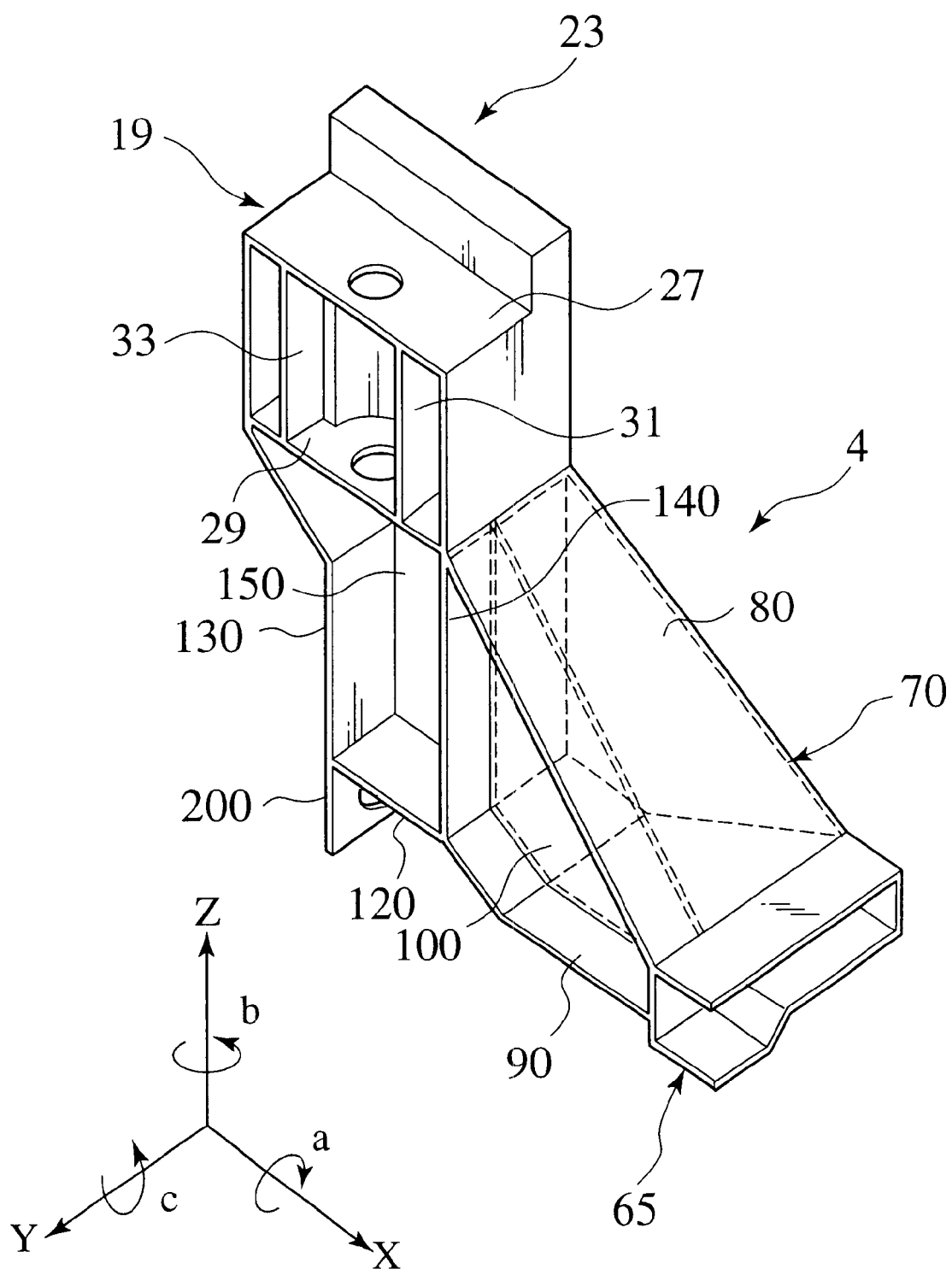
FIG. 15 is a perspective view which shows a connecting member which joins an end of a front side member to an extension cross member.
Figure 16:
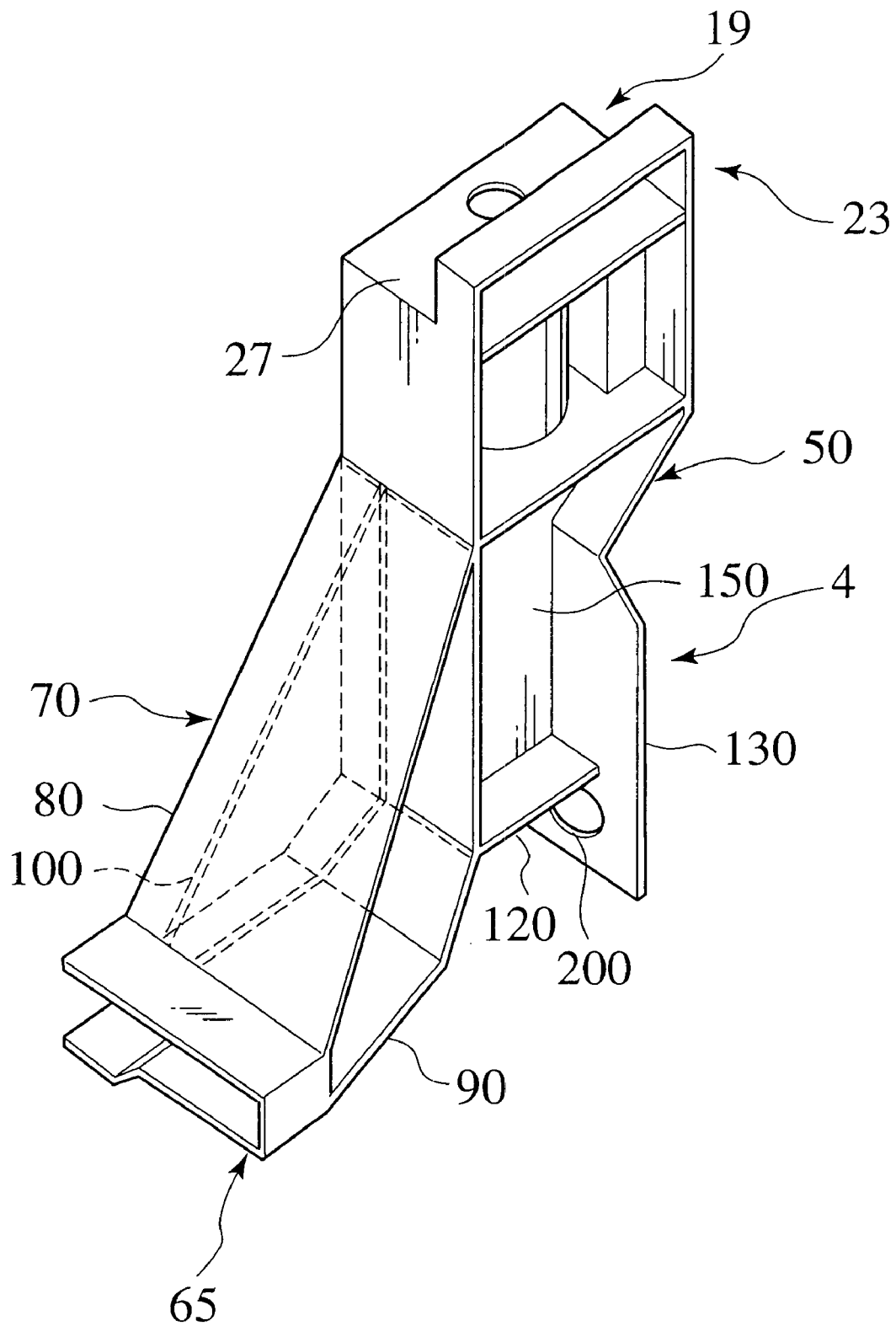
FIG. 16 is a perspective view which shows a rear portion of the connecting member of FIG. 15.
Figure 25:
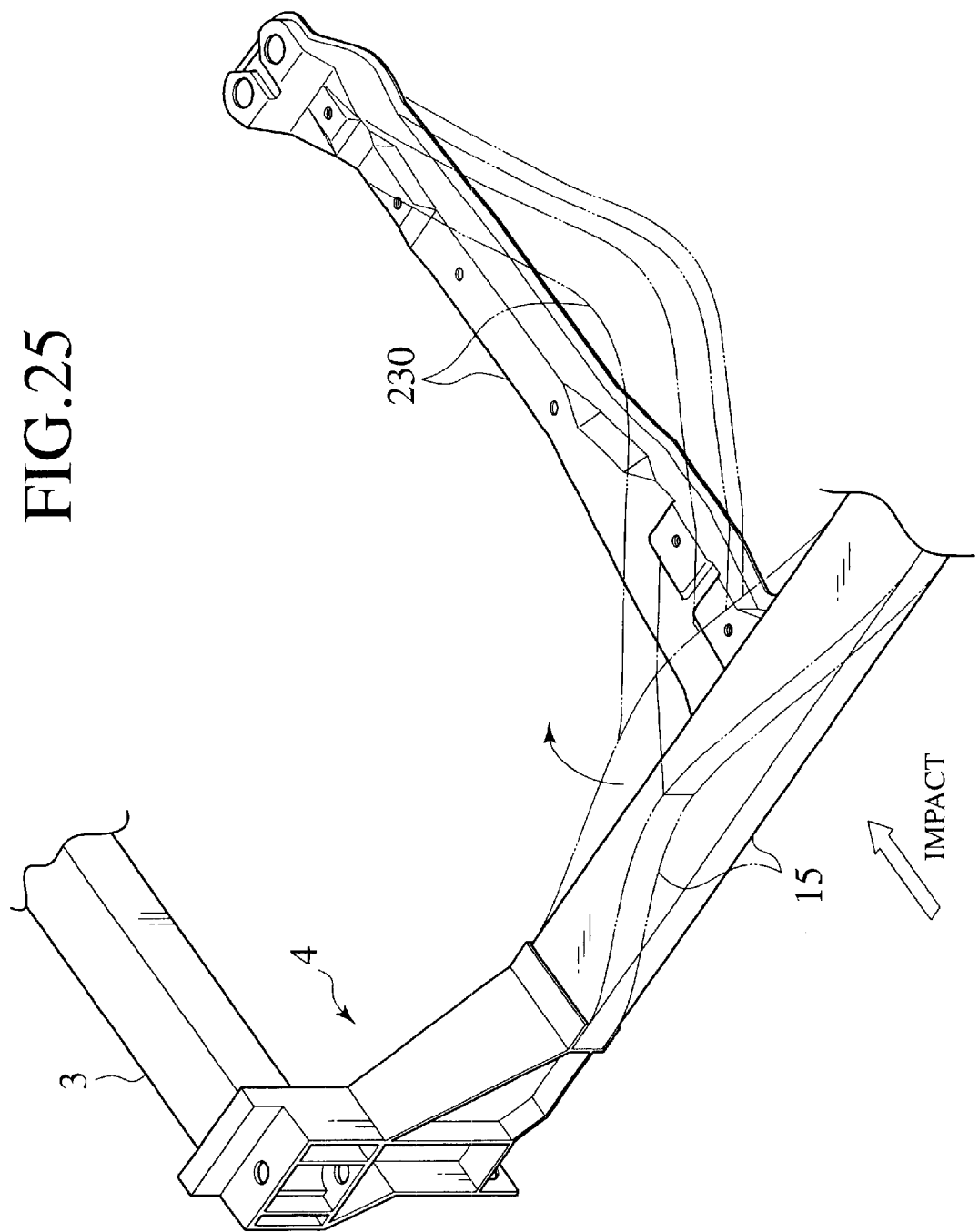
FIG. 25 is a perspective view which shows an extension cross member connecting with a front side member through a connecting member when a vehicle is involved in a front-end collision.

If the vehicle is involved in a front-end collision, and the impact acts on the central portion of the extension cross member 15, it will cause a torsional moment a, b, or c, as shown in FIG. 15, to act on the connecting member 4 around an axis X, Z, or Y because the extension cross member 15 is offset below the front side member 3. Particularly, in a case, as shown in FIG. 25, where the center member 230 is connected to the extension cross member 15 and the dash panel 90 shown in FIG. 1, downward bending of the center member 230, as indicated by a broken line, causes the central portion of the extension cross member 15 to be bent upward, as indicated by a broken line, thereby resulting in an increase in torsional moment a around the X axis.

The bridge joint 70 of the connecting member 4 has, as described above, the I-shaped cross section, so that the connecting member 4 is easily deformed as a whole by the torsional moment a around the X axis.

Figure 26:
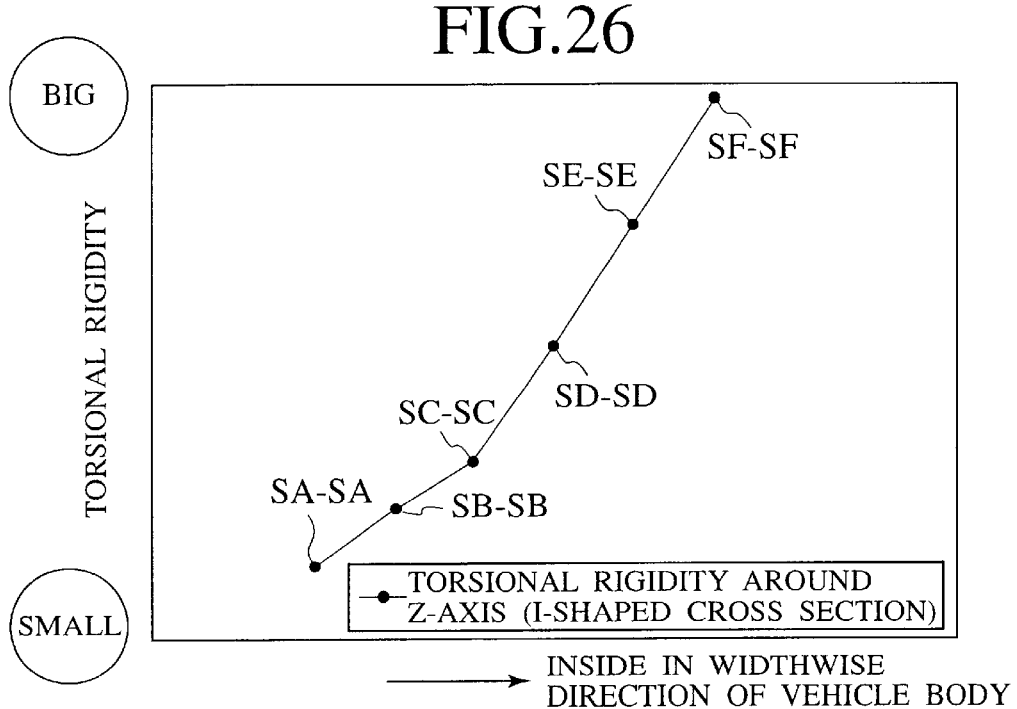
FIG. 26 shows the relation between a torsional moment around a Z axis shown in FIG. 15 and a torsional rigidity of a connecting member.

The upper and lower walls 80 and 90 of the bridge joint 70 are tapered outward of the vehicle body 60, so that the rigidity of the bridge joint 70 resistant to the torsional moment b around the Z axis is, as shown in FIG. 26, decreased from the cross section SF—SF to the cross section SA—SA.

Figure 27:
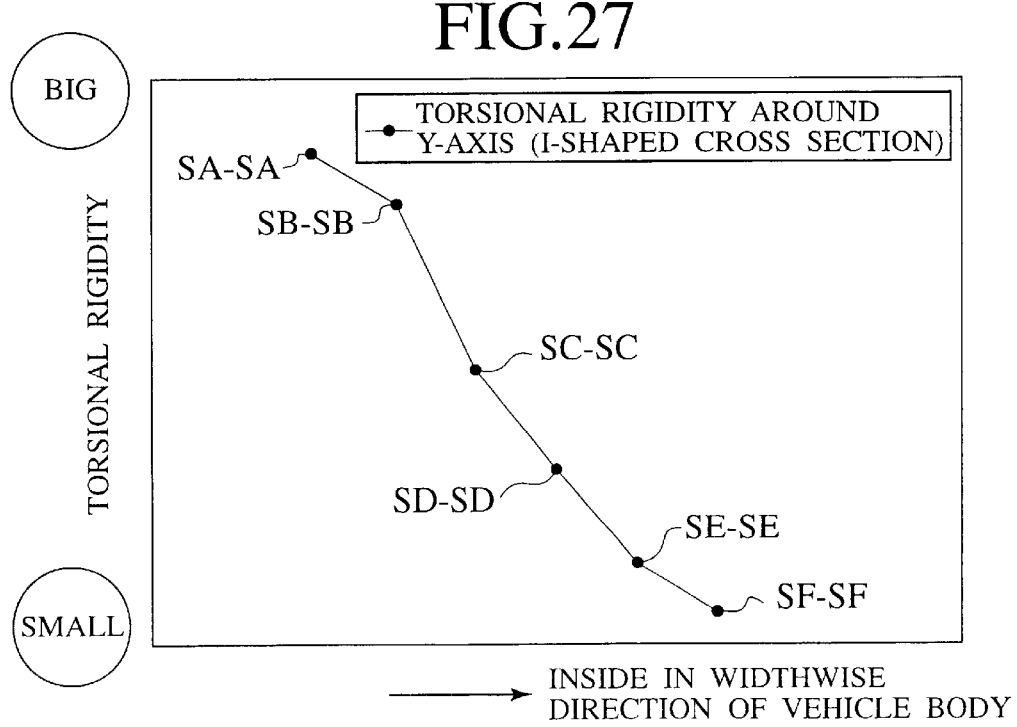
FIG. 27 shows the relation between a torsional moment around a Y axis shown in FIG. 15 and a torsional rigidity of a connecting member.

The upper wall 80 of the ridge joint 70 is inclined downward in the inward direction, and the height of the rib 100 is decreased inward of the vehicle body 60, so that the rigidity of the bridge joint 70 resistant to the torsional moment c around the Y axis is, as shown in FIG. 27, decreased from the cross section SA—SA to the cross section SF—SF.

Therefore, if torsional moments oriented in different directions: the torsional moment a around the X axis, the torsional moment b around the Z axis, and the torsional moment c around the Y axis are produced by the impact acting on the extension cross member 15 upon occurrence of a vehicle collision, the bridge joint 70 is deformed as a whole by the torsional moment a, the outer end of the bridge joint 70 is deformed by the torsional moment b, and the inner end of the bridge joint 70 is deformed by the torsional moment c, so that the connecting member 4 absorbs the bending and torsional pressures before transmitted to a corresponding one of the front side members 3, thereby causing only the axial collapsing pressure to act on the one of the front side members 3. This will result in an increase in absorbed amount of energy of the impact.

The cross member joint 65 of the connecting member 4 is, as clearly shown in FIG. 15, opened frontward, thereby offering ease of insertion of the extension cross member 15 in an assembling process and also causing the cross member 65 to be easily opened in the vertical direction when the torsional moment a around the X axis is produced by the impact exerted on the extension cross member 15, so that it absorbs the energy to the impact greatly.

The rib 100 of the bridge joint 70 extends in parallel to the longitudinal center line of the extension cross member 15 or in the lateral direction of the vehicle body 60, so that it absorbs the impact acting on the connecting member 4 in the widthwise direction of the vehicle body 60 as an in-plane force. This results in improved transmission of load between the extension cross member 15 and the bumper joint 23, thereby increasing the rigidity of the connection of each of the front side members 3 and the extension cross member 15.

The lower portion of the side wall 130 of the bumper joint 23, as described above, extends vertically in coincidence with the longitudinal center line of a corresponding one of the front side members 3 as viewed vertically. The side wall 130 has the tie-down 200 extending downward from the lower wall 120. This prevents the tractive force exerted on the tie-down 200 when the vehicle is drawn from acting on a corresponding one of the front side members 3 as the torsional moment b around the Z axis. The rib 150 of the bumper joint 23 is, as described above, formed in alignment with the rib 100 of the bridge joint 70 in the widthwise direction of the vehicle body 60, so that the tractive force is transmitted to the rib 100 of the bridge joint 70 as an in-plane force, thereby improving the rigidity for supporting the tie-down 200.

Figure 28:
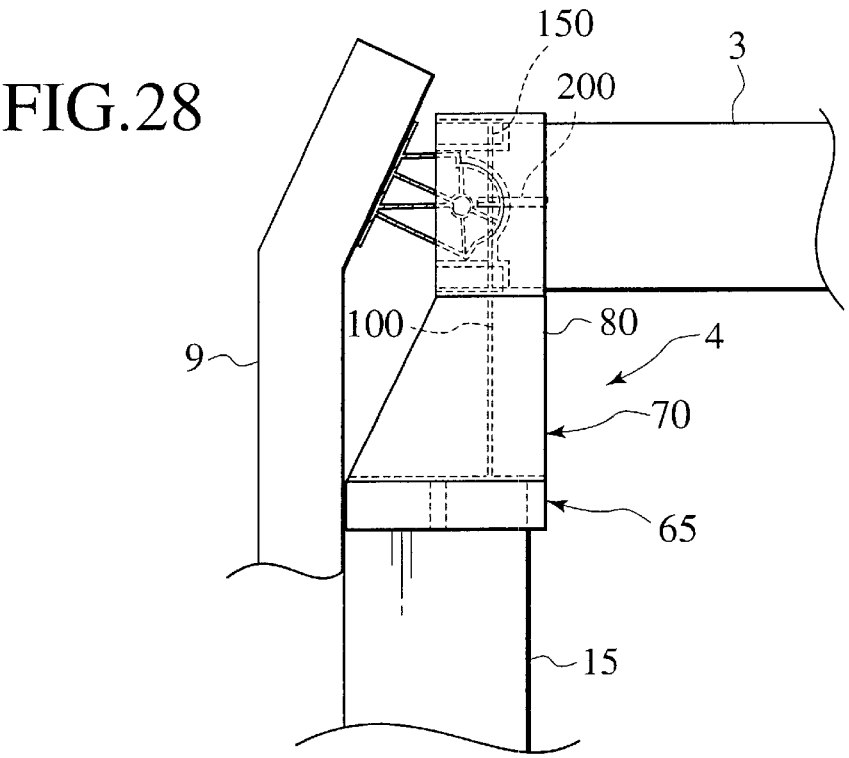
FIG. 28 is a plan view which shows a first modified form of a connecting member.

The front end surface of each of the connecting member 4 is; as described above, flush with the front end surface of the extension cross member 15 so that the impact arising from a front-end collision may act on the connecting members 4 and the extension cross member 15 simultaneously. Each of the connecting member 4 may, however, have the structure, as shown in FIG. 28, if it is required for the extension cross member 15 to be installed near the bumper reinforcement 9 depending upon the layout of a front engine compartment of the vehicle. Specifically, the front end surface of the connecting member 4 is shifted rearward from the front end surface of the extension cross member 15, while the rear end surface of the connecting member 4 lies flush with the rear end surface of the extension cross member 15. In this case, the connecting members 4 may offer substantially the same effects as those in the above embodiment.

Figure 29:
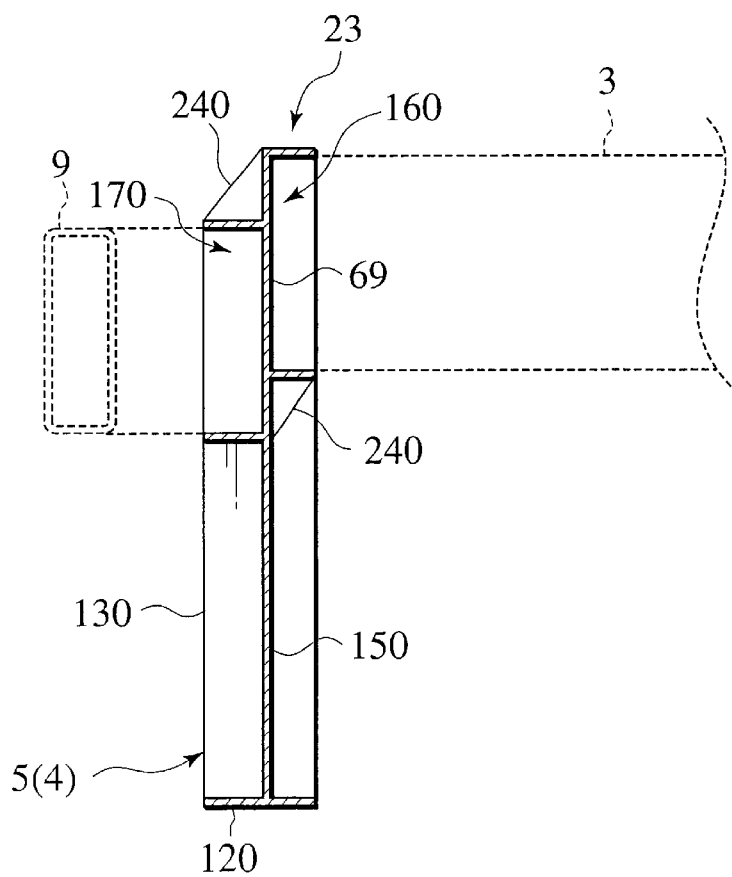
FIG. 29 is a horizontal sectional view which shows a second modified form of a connecting member.

If it is required for the bumper reinforcement 9 to be installed below the front side members 3 depending upon the layout of the front engine compartment, the bumper joint 23 may have the structure, as shown in FIG. 29. Specifically, the front socket 170 of each of the bumper joints 23 in which a corresponding one of the bumper brackets 5 and 7 is fitted is shifted downward from the rear socket 160 in which the end of a corresponding one of the front side member 3 is fitted. In this case, triangular ribs 240 may be welded to a corner of the upper wall of the front socket 170 and the flat vertical wall 69 and to a corner of the lower wall of the rear socket 160 and the flat vertical wall 69 for increasing the rigidity of the bumper joint 23. It is also advisable that the ribs 240 be installed in alignment with the side support walls 31 and 33 of the box-like support 19 in the vertical direction for increasing the strength or rigidity of the box-like support 19.

Figure 30:
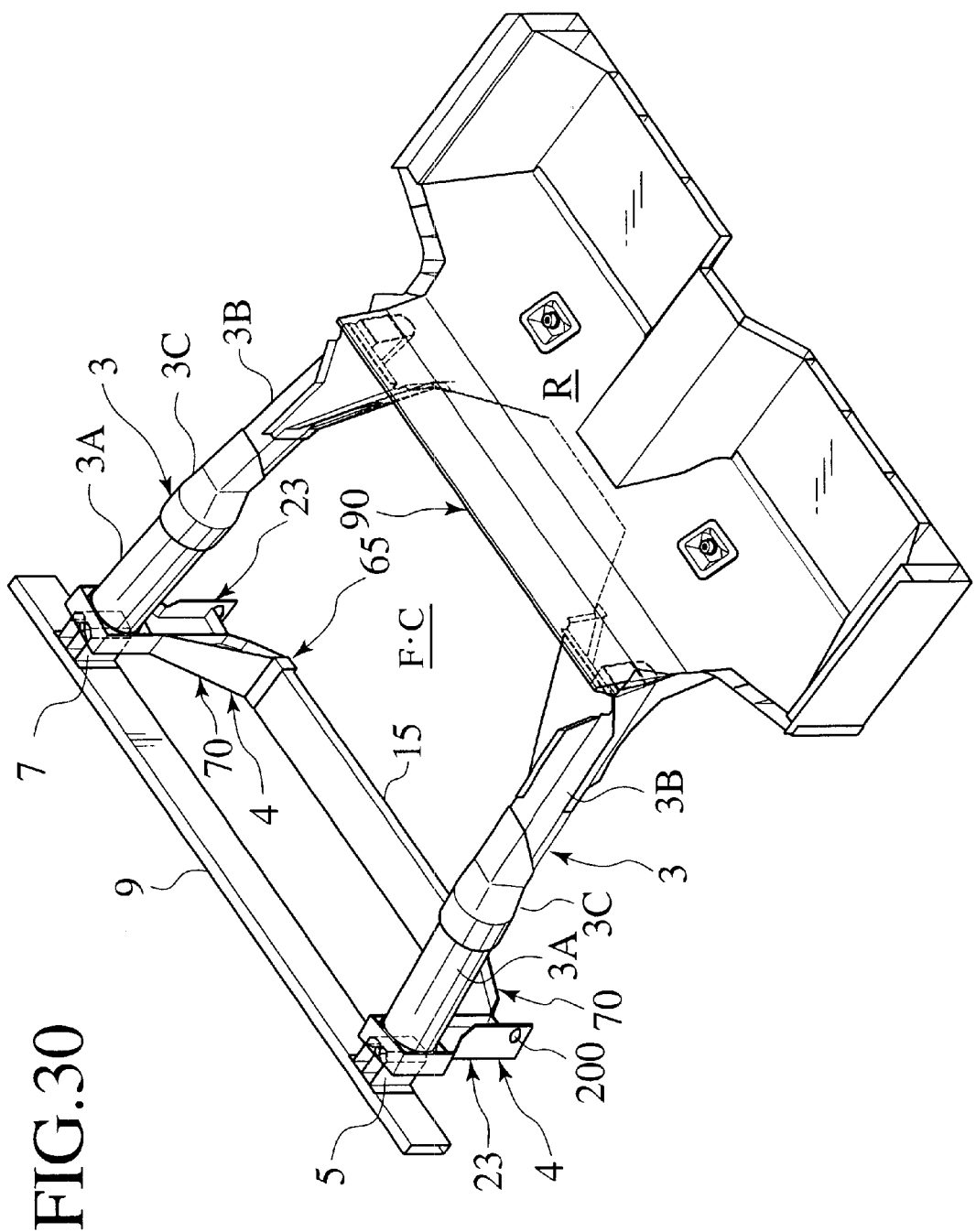
FIG. 30 is a perspective view which shows a front portion of a vehicle body on which a third modified form of a connecting member is mounted.
Figure 31:
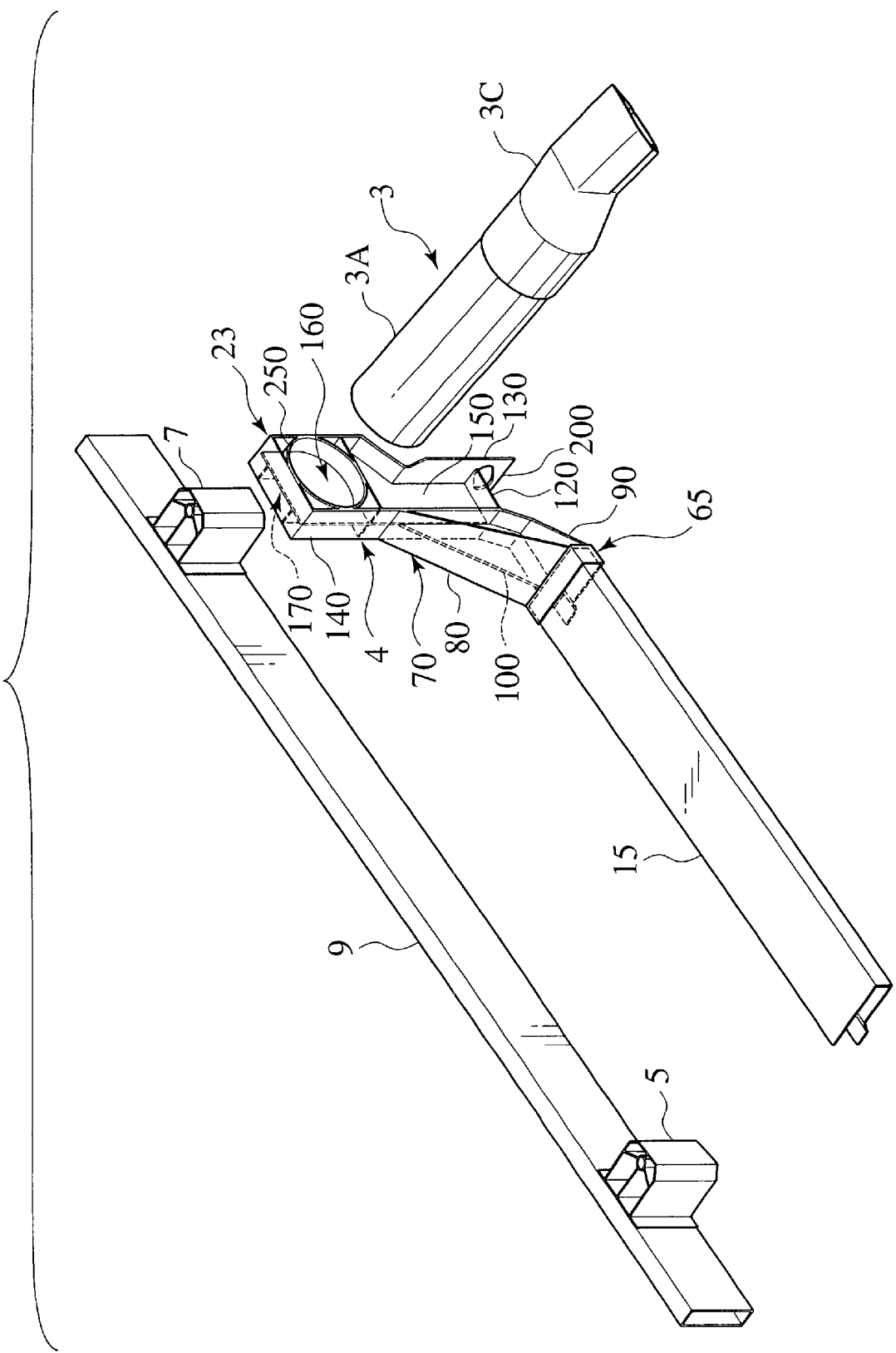
FIG. 31 is a partial perspective view which shows the connecting member of FIG. 30.
Figure 32:
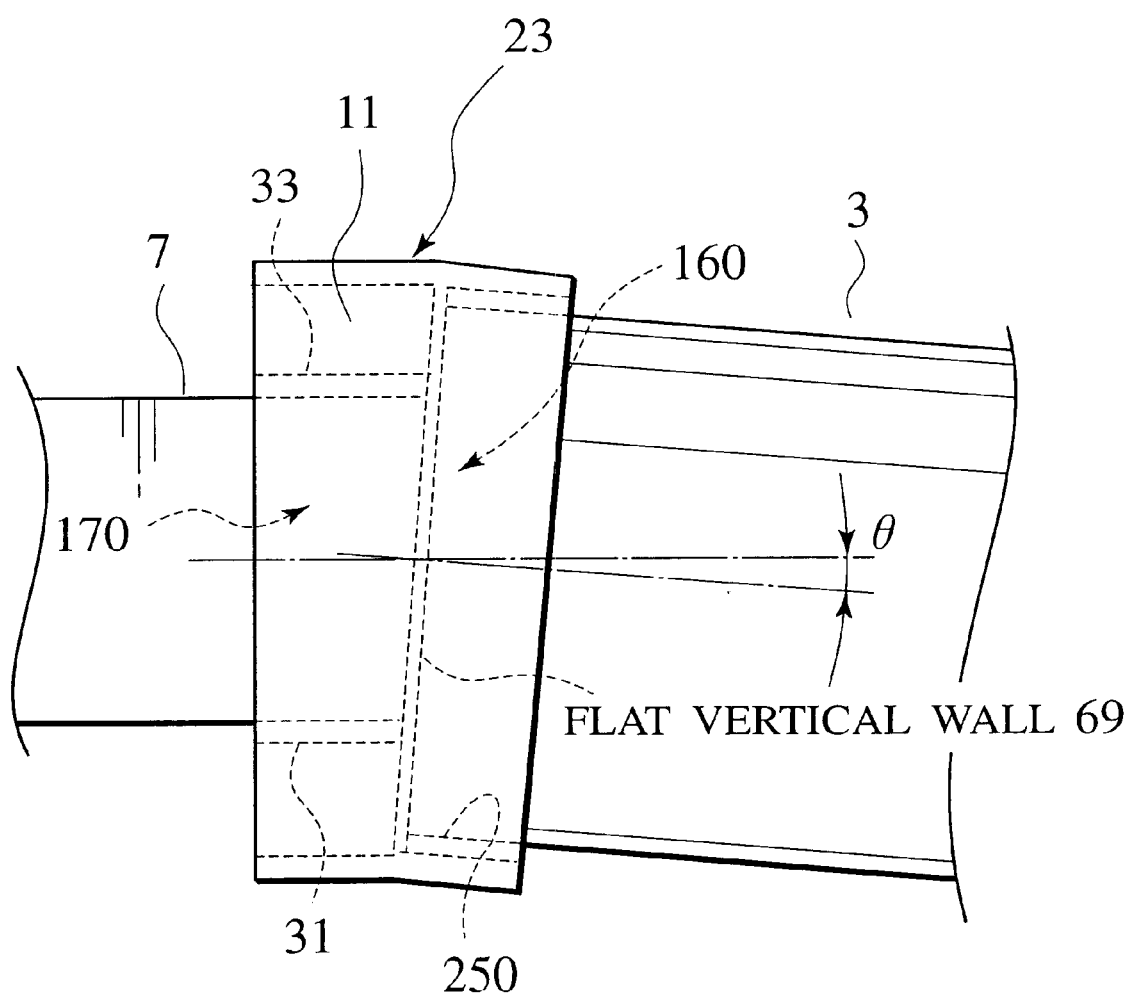
FIG. 32 is a side view which shows the connecting member of FIG. 30.

For reasons of strength, rigidity, and axial collapsing characteristics, each of the front side members 3, as shown in FIGS. 30 and 31, may consist of the front member 3A made of a circular member, the rear member 3B made of a rectangular member, and the joint 3C joining the front and rear members 3A and 3B. The right and left front side members 3 are, as clearly shown in FIG. 30, disposed longitudinally of the vehicle body 60 so that the interval therebetween may decrease as approaching the dash-panel 90. In this case, the rear socket 160 in the bumper joint 23 of each of the connecting members 4 is formed to be circular using the annular rib 250 for insertion of the end of the front member 3A of the front side member 3. The rear socket 160 is, as shown in FIG. 32, formed so that the center line thereof may be inclined at an angle θ to the center line of the front socket 170 into alignment with the longitudinal center line of each of the front side members 3, thereby eliminating the need for bending the front side members 3 inward, thus enabling the axial collapsing pressure arising from the impact upon occurrence of a vehicle collision to act on the front side members 3 effectively. The elimination of the need for bending the front side members 3 allows the front side members 3 to be made of an extruded light metal easily.

In a case, as shown in Pig. 33, where the radiator 270 is mounted on the radiator core support panel 260 and the extension cross member 15 coupled to the front side members 3 through the connecting members 4 in a manner, as described above, the space s may be formed by a side wall of the radiator 270, a lower wall of the radiator core support panel 260, and the connecting member 4. In this case, the shielding plate 280 may be formed integrally with the side wall of the connecting member 4 to close the space s, thereby avoiding a return of air warmed by the radiator 270 to the front of the radiator 270 through the space s, which keeps desired performance of heat exchange of the radiator 270.

The entire contents of Japanese Patent Application Nos. 11-254878 (filed on Sep. 8, 2000) and 11-254812 (filed on Sep. 8, 2000) are incorporated herein by reference.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A vehicle body comprising:
   side members disposed on sides of the vehicle body, said side member extending in a longitudinal direction of the vehicle body;
   a bumper reinforcement; and
   bumper brackets joining said bumper reinforcement to ends of said side members, respectively, each of said bumper brackets being made of one of an extruded material and a cast material and having a boss, a vertical wall formed around the boss and a rib connecting the boss and the vertical wall, the boss having formed therein a vertical hole extending vertically of the vehicle body and establishing connection of said bumper reinforcement and a corresponding one of said side members through a fastening member which is fitted within the vertical hole of the boss so as to allow said bumper bracket to rotate around the fastening member; wherein
   the bumper bracket disperses impact force transmitted from the bumper reinforcement through the rib, boss and vertical wall; and
   the bumper bracket is restricted in direction of rotation by interference between the vertical wall and the side member.

2. A vehicle body as set forth in claim 1, further comprising an extension cross member extending laterally of the vehicle body in connection with the ends of the side members.

3. A vehicle body as set forth in claim 1, further comprising:
   a stopper disposed between the bumper bracket and the side member to restrain outward rotational motion of the bumper bracket,
   wherein each of said bumper brackets is so provided that it rotates only in an inward direction of the vehicle body.

4. A vehicle body comprising:
   side members disposed on sides of the vehicle body, said side member extending in a longitudinal direction of the vehicle body;
   a bumper reinforcement; and
   bumper brackets joining said bumper reinforcement to ends of said side members, respectively, each of said bumper brackets being made of one of an extruded material and a cast material and having a boss, the boss having formed therein a vertical hole extending vertically of the vehicle body and establishing connection of said bumper reinforcement and a corresponding one of said side members through a fastening member which is fitted within the vertical hole of the boss so as to allow said bumper bracket to rotate around the fastening member,
   wherein each of said bumper brackets has a first wall curved around a length of the vertical hole of the boss, and further comprising a second wall provided on the end of each of the side members which is curved to establish surface-to-surface contact with the first wall of said bumper bracket.

5. A vehicle body as set forth in claim 4, further comprising box-like supports each of which supports the connection of said bumper reinforcement and one of said side members through said bumper bracket and which includes an upper, a lower, a right, and a left support wall and said second curved wall, said second curved wall projecting rearward of the vehicle body, and wherein each of said bumper brackets includes a joint portion disposed within a chamber defined by the upper, lower, right, and the left support walls of the box-like support, the joint portion having said first curved wall projecting rearward of the vehicle body for establishing the constant surface-to-surface contact with said second curved wall.

6. A vehicle body as set forth in claim 4, wherein the second curved wall is provided by a separate member installed on the end of each of said side members.

7. A vehicle body as set forth in claim 5, wherein each of said box-like supports has a stopper wall formed inside the second curved wall in a widthwise direction of the vehicle body, and wherein each of the joint portions has a stopper wall which is brought into direct engagement with the stopper wall of a corresponding one of said box-like supports when said joint portion is turned inwardly of the vehicle body to restrain further rotation of said joint portion.

8. A vehicle body as set forth in claim 5, wherein each of said box-like supports has a lock wall formed outside the second curved wall in a widthwise direction of the vehicle body, and wherein each of the joint portions has a contact wall which is placed in direct engagement with the lock wall of a corresponding one of said box-like supports to restrain outward rotation of said joint portion.

9. A vehicle body comprising:
   side members disposed on sides of the vehicle body, said side member extending in a longitudinal direction of the vehicle body;
   a bumper reinforcement; and
   bumper brackets joining said bumper reinforcement to ends of said side members, respectively, each of said bumper brackets being made of one of an extruded material and a cast material and having a boss, the boss having formed therein a vertical hole extending vertically of the vehicle body and establishing connection of said bumper reinforcement and a corresponding one of said side members through a fastening member which is fitted within the vertical hole of the boss so as to allow said bumper bracket to rotate around the fastening member, box-like supports each of which supports the connection of said bumper reinforcement and one of said side members through a corresponding one of said bumper brackets and which includes an upper, a lower, a right, and a left support wall and a flat rear wall extending in a widthwise direction of the vehicle body, and wherein each of said bumper brackets includes a joint portion disposed within a chamber defined by the upper, lower, right, and the left support walls of the box-like support, the joint portion having a first and a second contact wall, the first contact wall being in constant contact with the flat rear wall of the box-like support, the second contact wall being brought into contact with the flat rear wall when said bumper bracket is turned around the fastening member.

10. A vehicle body as set forth in claim 4, wherein each of said bumper brackets includes at least first and second walls, the first wall extending in the longitudinal direction of the vehicle body, the second wall being oriented so as to extend in the longitudinal direction of the vehicle body when a corresponding one of said bumper brackets is turned around said fastening member through a given angle.

11. A vehicle body as set forth in claim 4, wherein each of said bumper brackets includes a front outside wall, a rear inside wall, and a front inside wall, the front outside wall extending in the longitudinal direction of the vehicle body frontward from said boss, the rear inside wall extending in the longitudinal direction of the vehicle body inside the boss in the widthwise direction of the vehicle body, the front inside wall being disposed in front of and inside said boss in the widthwise direction of the vehicle body and oriented so as to extend in the longitudinal direction of the vehicle body when a corresponding one of said bumper brackets is turned around said fastening member through a given angle.

12. A vehicle body as set forth in claim 11, wherein each of said bumper brackets also includes an intermediate wall extending within an inner chamber of said bumper bracket.

13. A vehicle body as set forth in claim 1, wherein said bumper brackets are each made by extruding a metal.

14. A vehicle body as set forth in claim 1, wherein said bumper brackets are each made of a cast metal.

15. A vehicle body as set forth in claim 1, wherein said bumper reinforcement has a portion bent at given angle to a length thereof.

16. A vehicle body comprising:

side members disposed on sides of the vehicle body, said side member extending in a longitudinal direction of the vehicle body;

a bumper reinforcement;

bumper brackets joining said bumper reinforcement to ends of said side members, respectively, each of said bumper brackets being made of one of an extruded material and a cast material and having a boss, the boss having formed therein a vertical hole extending vertically of the vehicle body and establishing connection of said bumper reinforcement and a corresponding one of said side members through a fastening member which is fitted within the vertical hole of the boss so as to allow said bumper bracket to rotate around the fastening member, an extension cross member extending laterally of the vehicle body in connection with the ends of the side members; and joint members each of which supports the connection of said bumper reinforcement and one of said side members through a corresponding one of said bumper brackets, each of said joint members having a lateral joint portion which has a bridge joint connecting an end of one of said side members and the end of said extension cross member, the bridge joint including an upper wall inclined from an upper portion of said joint member connected to the end of said side member, a lower wall having substantially the same projected area as that of said upper wall, and a triangular rib wall extending vertically between the upper and lower walls to have an I-shaped cross section together with the upper and lower walls as viewed from a lateral direction of the vehicle body.

17. A vehicle body as set forth in claim 16, wherein the rib wall extends in parallel to a longitudinal center line of the extension cross member.

18. A vehicle body comprising:

side members disposed on sides of the vehicle body, said side member extending in a longitudinal direction of the vehicle body;

a bumper reinforcement;

bumper brackets joining said bumper reinforcement to ends of said side members, respectively, each of said bumper brackets being made of one of an extruded material and a cast material and having a boss, the boss having formed therein a vertical hole extending vertically of the vehicle body and establishing connection of said bumper reinforcement and a corresponding one of said side members through a fastening member which is fitted within the vertical hole of the boss so as to allow said bumper bracket to rotate around the fastening member, an extension cross member extending laterally of the vehicle body in connection with the ends of the side members; and joint members each of which supports the connection of said bumper reinforcement and one of said side members through a corresponding one of said bumper brackets, each of said joint members including an upper support wall, a lower support wall, side support walls extending between the upper and lower support walls, and a rib wall extending in a widthwise direction of the vehicle body to form within a chamber defined by the upper, lower, and side support walls a first socket into which the end of a corresponding one of said side members is fitted and a second socket into which a corresponding one of said bumper brackets is fitted.

19. A vehicle body as set forth in claim 18, wherein the first socket is offset from the second socket in the vertical direction of the vehicle body, and further comprising reinforcement ribs connected to upper portions and lower portions of the first and second sockets, respectively.

20. A vehicle body as set forth in claim 18, wherein said side members so extend that an interval therebetween increases as approaching to rear portions of said side members, and wherein a center line of the first socket extending in the longitudinal direction of the vehicle body is inclined at a given angle to a center line of the second socket extending in the longitudinal direction of the vehicle body into alignment with a longitudinal center line of a corresponding one of said side members.

21. A vehicle body comprising:

side member means disposed on sides of the vehicle body, said side member means extending in a longitudinal direction of the vehicle body;

bumper reinforcement means; and bumper bracket means for joining said bumper reinforcement means to ends of said side member means, said bumper bracket means being made of one of an extruded material and a cast material and having a boss, the boss having formed therein a vertical hole extending vertically of the vehicle body and establishing connection of said bumper reinforcement means and a corresponding one of said side member means through a fastening means which is fitted within the vertical hole of the boss so as to allow said bumper bracket means to rotate around the fastening mean; wherein each bumper bracket means comprises a boss, a vertical wall formed around the boss and a rib connecting the boss and the vertical wall;

the bumper bracket means disperses impact force transmitted from the bumper reinforcement means through the rib, boss and vertical wall; and the bumper bracket means is restricted in direction of rotation by interference between the vertical wall and the side member means.

* * * * *